(12) United States Patent
Niu et al.

(10) Patent No.: US 12,448,623 B2
(45) Date of Patent: Oct. 21, 2025

(54) siRNA SPECIFICALLY BINDING TO M2 MACROPHAGE CD206 AND APPLICATION THEREOF

(71) Applicants: Gang Niu, Beijing (CN); Huanran Tan, Beijing (CN)

(72) Inventors: Gang Niu, Beijing (CN); Huanran Tan, Beijing (CN)

( * ) Notice: Subject to any disclaimer, the term of this patent is extended or adjusted under 35 U.S.C. 154(b) by 0 days.

(21) Appl. No.: 18/864,911

(22) PCT Filed: Apr. 21, 2023

(86) PCT No.: PCT/CN2023/089770
§ 371 (c)(1),
(2) Date: Nov. 12, 2024

(87) PCT Pub. No.: WO2023/216843
PCT Pub. Date: Nov. 16, 2023

(65) Prior Publication Data
US 2025/0163431 A1    May 22, 2025

(30) Foreign Application Priority Data
May 12, 2022 (CN) .......................... 202210514519.6

(51) Int. Cl.
C12N 15/113    (2010.01)
A61P 35/00    (2006.01)

(52) U.S. Cl.
CPC .......... C12N 15/1138 (2013.01); A61P 35/00 (2018.01); *C12N 2310/14* (2013.01)

(58) Field of Classification Search
CPC .. C12N 15/1138; C12N 2310/14; A61P 35/00
USPC ..................... 435/6.1, 91.1, 91.31, 455, 458; 514/44 A; 536/23.1, 24.5
See application file for complete search history.

(56) References Cited

U.S. PATENT DOCUMENTS

2008/0113351 A1    5/2008    Naito et al.

FOREIGN PATENT DOCUMENTS

| CN | 101023185 A | 8/2007 |
| CN | 101052717 A | 10/2007 |
| CN | 113577093 A | 11/2021 |
| CN | 114207117 A | 3/2022 |

OTHER PUBLICATIONS

Li Peihan, et al., Construction of a curcumin-siRNA co-delivery system based on mesoporous silica and its effect on M2-type polarization of macrophages, Journal of Prevention and Treatment for Stomatological Diseases, 2021, pp. 306-313, vol. 29 No. 5.
Stengel S, et al., NM_002438.4, Homo sapiens mannose receptor C-type 1 (MRC1), mRNA, 2020.
Naito, Y., et al., GenBank: FW742144.1, WO 2005116204-A/148670: Double strand polynucleotides generating RNA interference, 2011.
Naito, Y., et al., GenBank: FW742143.1, WO 2005116204-A/148669: Double strand polynucleotides generating RNA interference, 2011.
McSwiggen, J., et al., GenBank: LZ272129.1, JP 2015518713-A/16642: Compositions and Methods for Modulating UTRN Expression, 2018.
Domenyuk, V., et al., GenBank: MB336891.1, JP 2019516393-A/139090: Oligonucleotide Probes and Uses Thereof, 2019.
Ohsumi, T.K, et al., GenBank: MA518526.1, JP 2018138019-A/90452: Polycomb-Associated Non-Coding RNAs, 2018.
Xiao, N., et al., GenBank: MC442508.1, JP 2019033750-A/4001: Aptamers and Uses Thereof, 2020.
SAWA,A., GenBank: GP205083.1, Sequence 38 from U.S. Pat. No. 7,491,499, 2009.
Naito,Y., et al., GenBank: FZ161142.1, WO 2005116204-A/567667: Double strand polynucleotides generating RNA interference, 2011.
Naito,Y., et al., GenBank: FZ161143.1, WO 2005116204-A/567668: Double strand polynucleotides generating RNA interference, 2011.
Naito, Y., et al., GenBank: FZ161103.1, WO 2005116204-A/567628: Double strand polynucleotides generating RNA interference, 2011.
Joseph Sambrook, et al., Molecular Cloning: A Laboratory Manual, 1989, pp. 1-1589, Cold Spring Harbor Laboratory Press.
Madeleine M. Larue, et al., Metabolic reprogramming of tumor-associated macrophages by collagen turnover promotes fibrosis in pancreatic cancer, PNAS, 2022, pp. 1-10, vol. 119 No. 16, e2119168119.

*Primary Examiner* — Jane J Zara
(74) *Attorney, Agent, or Firm* — Bayramoglu Law Offices LLC

(57) ABSTRACT

An siRNA specifically binding to M2 macrophage CD206 is provided, which is at least one of siRNA-1, siRNA-2, and siRNA-3, or at least one of siRNA-4, siRNA-5, and siRNA-6. The siRNA specifically combined with CD206 of the M2 macrophage reduces the expression of CD206 by specifically binding to CD206 of the macrophage, thereby promoting the proliferation of the M2 macrophage and further inhibiting the proliferation and migration of tumor cells.

3 Claims, 12 Drawing Sheets
Specification includes a Sequence Listing.

siRNA SPECIFICALLY BINDING TO M2 MACROPHAGE CD206 AND APPLICATION THEREOF

CROSS REFERENCE TO THE RELATED APPLICATIONS

This application is the national phase entry of International Application No. PCT/CN2023/089770, filed on Apr. 21, 2023, which is based upon and claims priority to Chinese Patent Application No. 202210514519.6, filed on May 12, 2022, the entire contents of which are incorporated herein by reference.

SEQUENCE LISTING

The instant application contains a Sequence Listing which has been submitted in XML format via EFS-Web and is hereby incorporated by reference in its entirety. Said XML copy is named GBBXZC010_Sequence_Listing.xml, created on 11/11/2024, and is 32,514 bytes in size.

TECHNICAL FIELD

The invention belongs to the field of biomedicine, and relates to an siRNA, in particular to an siRNA specifically binding to M2 macrophage CD206 and the application thereof.

BACKGROUND

It has been more than 100 years since the discovery of macrophages. Macrophages are immune cells widely distributed in the whole body tissue and blood, which play an important role in resisting bacteria and viruses in the body. Macrophages are one type of phagocytes that belong to the monocyte cell system. Macrophages are one of the most important participants in the autoimmune system in the tumor microenvironment in vivo, and the diversity of their roles in the tumor microenvironment has been constantly revealed. In recent years, the research on tumor-associated macrophages has found the theoretical and factual basis for tumor metastasis and recurrence as well as drug resistance. The presence of tumor-associated macrophages prevents chemotherapy and other treatments of the tumor from completely killing all tumor cells. Previous studies have suggested that macrophages are pure tumor killers. Subsequent studies have gradually revealed that macrophages may also promote the growth of tumors, in other words, tumor-related macrophages play a role. Macrophages not only indirectly affect the occurrence and development of tumors through their own biological behaviors, but also can directly play a part in tumors by taking advantage of their own functional advantages, playing a very important role in tumor metastasis.

1 Macrophages and their Functions 1.1 Source and Function of Macrophage

Macrophages are involved in congenital and acquired immunity, angiogenesis, proliferation and even the formation of malignant tumors. Macrophages are a group of heterogeneous cells that can perform different functions in a variety of organs and tissues. Even within a single organization, their function varies with location (Ref. 8). Monocyte phagocytes, the main components of innate immunity, can non-specifically phagocytize foreign bodies, bacteria, aging and mutated cells to maintain the stability of the internal environment of the body, as well as natural anti-infection and anti-tumor immunity. Macrophages are heterogeneous, including cells in different stages of differentiation and different activation states, each with corresponding morphology, phenotype, metabolic characteristics and biological function. Macrophages can secrete pro-inflammatory factors such as tumor necrosis factor-α (TNF-α) and interleukin-6 (IL-6), which play an important role in killing and phagocytizing tumor cells. More and more studies have proved that macrophages, as an important part of tumor microenvironment, are involved in tumor growth, invasion and metastasis, angiogenesis, immune escape and recurrence. Macrophages can be polarized/differentiated into two different subtypes in different microenvironment: M1 macrophages and M2 macrophages.

Classically macrophage are non-activated cells, which are small in size and weak in killing activity in the resting state. After polarization (or activation), macrophages can be divided into two types. One type is typically activated macrophages (M1) and alternately activated macrophages (M2). M1 macrophages preferentially express pro-inflammatory molecules, such as nitric oxide, interleukin IL12, CXCL9, CXCL10, CXCL11, and reactive oxygen species, which contribute to tumor inhibition. However, M2 macrophages express anti-inflammatory molecules such as ornithine, IL-10, CCL17, CCL18, CCL22, and scavenger receptors. M2 macrophages are thought to be associated with tumor promotion by inducing angiogenesis, immunosuppression, epithelial mesenchymal stem cell formation, and tumor cell activation. Similarly, when the body is injured, M1 macrophages are the first activated pro-inflammatory cells in the wound site, and M2 macrophages, also known as anti-inflammatory drugs, play an important role in the human body.

Different types of pathogens, inflammatory stimuli and cytokines such as IFN-7 can activate macrophages. Activated macrophages release a variety of cytokines and chemokines and act as antigen-presenting cells, participating in the initiation and regulation of immune response. M1 macrophages are induced by Th1 cytokines, such as interferon-γ (IFN-γ), lipopolysaccharide (LPS) and granulocyte-macrophage colony-stimulating factor, express surface markers such as CD80 and CD86, and secrete cytokines such as interleukin (IL-6), inducible nitric oxide synthase (iNOS) and tumor necrosis factor-α (TNF-α), which play an important role in anti-bacteria and anti-infection.

Different types of cytokines and their combinations can induce activated macrophages with different activation and functional characteristics. Activated macrophages such as IL4 and IL10 have weakened antigen presentation ability compared with M1 type macrophages, which is called alternatively activated M2 type macrophages, that is, M2 macrophages. M2 macrophages are induced and produced by Th2 cytokines, express CD163 and CD206, and secrete IL-4, IL-13, IL-10, transforming growth factor β (TGF-β), arginase 1 (arginine 1, Arg1), chemokines (Chemokines) CCL17 and CCL22 and the like. Studies have found that M2-type macrophages can promote the proliferation of tumor cells, which is closely related to its epithelial-mesenchymal transition (EMT), and the promotion of the formation of tumor stem cells. Studies have found that exosomes derived from lung cancer and breast cancer cells can deliver activated epidermal growth factor receptor (EGFR) to macrophages, resulting in decreased secretion of interferon-β (interferon-β, IFN-β) and decreased innate immunity of tumor patients through mitogen-activated protein kinase (mitogen-activated protein kinase 2, MEKK2). All these studies have suggested that macrophages play different roles in the occurrence, development and metastasis of tumors.

1.2 Tumor-Associated Macrophages

Macrophages are the cells with the highest proportion in the tumor microenvironment (TME), accounting for about 50% to 80%. The components of macrophages in TME are complex, including M1M2 macrophages and tumor-related macrophages. M1-type macrophages mainly kill tumor cells, while M2-type macrophages exert effects on the occurrence and development of tumors mainly in promoting the growth of tumors, promoting the formation of tumor new blood vessels, promoting the invasion and distal metastasis of tumors, and promoting the immune escape and drug resistance of tumors. In recent years, more and more studies have shown that tumor-associated macrophage, TAM), whose function is consistent with that of M2-type macrophages, can promote the further development of tumors, including promotion of tumor proliferation, increase of tumor cell activity, promotion of tumorigenesis and genetic instability. It can be seen that the interaction between TAM and tumor or the whole microenvironment in tumor microenvironment (TME) is very complex, and further research and exploration are required in order to have a relatively clear understanding of the interaction between TAM and tumor. TAM secretes and releases growth factors such as platelet-derived growth factor, hepatocyte growth factor, and epidermal growth factor, which can directly act on receptors of tumor cells to promote mitosis. In addition, cytokine IL-6 secreted by TAM can also activate intracellular pathways by acting on tumor cell transcription activation factor stat3 to indirectly promote the growth of tumor cells. Moreover, TAM can also release enzymes that promote tumor growth. Tumor cells need a large amount of nutrients and oxygen. Many clinical data show that the density of macrophages in local tumor tissues is closely related to the area of nascent microvessels. TAM expresses angiopoietin receptor TIE2. In addition, TAM also secretes a large number of vasogenic molecules such as TNF-α and IL-8 to promote the formation of blood vessels. In terms of promoting tumor invasion and metastasis, TAM secretes proteolytic enzymes that degrade extracellular matrix, such as matrix metalloproteinases (MMPs), cathepsins and urokinase fibrinogen activator, and secretes extracellular matrix remodeling enzymes, such as lysinyl oxidase, which can degrade fibrous connective tissue around tumors to allow tumor cells to easily invade carcinoma-in-situ tissue and enter the surrounding circulatory system for distant metastasis. The proteolytic enzyme cleans up the obstacle for the smooth metastasis of the tumor. TAM-induced new blood vessels also showed high permeability due to the incomplete basement membrane, making them more vulnerable to invasion. TAM, as a "traitor" of body immunity, apart from the above functions, its own secretion of cytokine IL-10 leads to the reduction of its own release of pro-inflammatory factor IL-12, thereby reducing the ability of natural T cells to produce cytotoxic factor interferon γ. High level of IL-10 also inhibits the enzymes needed for the maturation of dendritic cells. In addition, TAM secretes arginase I, which is able to hydrolyze L-arginine, to affect the expression and proliferation of T cell receptors, so that CD4+ and CD8+ T cells lose their reactivity to stimulation. The above-mentioned studies and more indicate that only M2-TAM is the "accomplice" of tumor, and further research on M2 may become a valuable reference for clinical treatment and prognosis judgment of tumor metastasis.

1.3 Macrophage Surface Markers

There are many important molecular markers on the surface of macrophages, such as IL series molecules, CD series molecules, TGF-β and MHC series molecules, and the like. CD206 in these molecules is one of the very important surface markers reflecting the functional state of macrophages.

CD206 is a 175-190 kDa endocytosis receptor, also known as mannose receptor C-type 1 (MRC1), macrophage mannose receptor, (MMR), or C-type lectin domain family 13, member D (CLEC13D). CD206 is expressed in most macrophage populations, including TAMs, as well as in dendritic cells in specific tissues and in hepatic, splenic, lymphatic, and dermal microvascular endothelial cells.

Human CD206 is composed of 1456 amino acids (aa) and its extracellular region contains three types of domains, one containing an N-terminal cysteine (CR)-rich domain, one fibronectin repeat type II (FNII), and eight C-type lectin domains (CTLD). The CR domain of human CD206 is 83%, 84%, 89%, 89%, and 90% amino acid sequence identical to the CR domain of mouse, rat, horse, pig, and dog CD206, respectively. The CR domain can bind to sulfated sugars terminated with SO4-3-Gal or SO4-3/4-GalNAc and is capable of recognizing pituitary hormones such as luteinizing hormone (LH) and thyroid-stimulating hormone (TSH), chondroitin sulfate and N-acetylgalactosamine sulfate. The FNII domain mediates Ca2+-independent collagen binding, particularly collagen I, II, III, and IV. CTLD is involved in Ca2+-dependent recognition of terminal mannose, fucose, or N-acetylglucosamine pullulans, which are ubiquitous in pathogenic microorganisms.

1.4 Function of CD206

CD206 is an important pattern recognition receptor (PRR) and endocytosis receptor in the innate immune system, and it is abundantly expressed in alveolar macrophages, monocyte-derived macrophages, and dendritic cells. CD206 is also expressed in certain endothelial cell subsets, tracheal smooth muscle cells, retinal epithelial cells, renal vascular mesangial cells, sperm acrosome cells, and brain microglia. CD206 can recognize and bind a wide range of endogenous and exogenous ligands, and plays an important role in maintaining homeostasis, recognizing and phagocytosis of pathogens, inducing cytokines, and antigen presentation.

CD206 is involved in pathogen recognition and phagocytosis. CD206 can recognize polysaccharide components of cell walls, such as yeast mannan, bacterial capsule, and LPS. Through CD206, macrophages can engulf many non-opsonized microorganisms, including bacteria, fungi, and protozoa. Mannose receptors have been demonstrated to be involved in the recognition and clearance of *Candida albicans, Mycobacterium tuberculosis, Staphylococcus aureus*, and *Lactobacillus acidophilus*. Upon pathogen recognition, the release of superoxide anions from macrophages increases while inducing the synthesis of related cytokines. Mediated by the actin cytoskeleton, the macrophage membrane can undergo deformation and movement to surround the pathogen or target cells infected by the pathogen, to form phagocytes, which will digest and kill the pathogen.

CD206 is involved in intracellular signal transduction and affects the expression of many genes. Interaction between MR (Mannose Receptor) and ligand can trigger a series of signal cascade amplification in cells to activate transcription, promote or inhibit the expression of NO and a variety of cytokines, such as TNF-α, IL-12, IL-10, IL-1ra, IL-RII, and the like. MR has a short intracellular domain without a signal transduction motif, so that the involvement of MR in signal transduction requires the involvement of other receptors. Previous studies have confirmed that the induction of IL-8 requires the participation of TLR-2. MR regulates the immune response process of the body by mediating the production of different cytokines.

CD206 is involved in antigen processing and presentation. CD206 primarily ingests and concentrates non-autoantigens to facilitate antigen processing and presentation. CD206 mediates cross-presentation of antigens. That is, internalized foreign proteins are presented to CD8+ T cells through MHC class I molecules. This function is important in immune responses to indirect infection with APC virus and to non-endogenous expression of tumor antigens. The transfer of exogenous antigens from the endosome to the cytoplasm for protein degradation is the key to antigen cross-presentation.

1.5 CD206 and Tumor Associated Macrophages

In recent years, tumor microenvironment (TME) has become the key to tumor research. Tumor microenvironment includes matrix cells, fibroblasts, immune cells and extracellular matrix. A large number of studies have proved that the occurrence and development of breast cancer are closely related to TME, and each component of TME plays a key role in the development of breast cancer in different stages.

Tumor associated macrophages (TAMs) are the most abundant immune cells in TME. TAMs account for more than 50% of the cells in the breast cancer tumor microenvironment. Breast cancer cells secrete chemokine (C-C motif) ligand 2 (CCL2), CCL5, and CXCL12 to recruit monocytes. Monocytes are stimulated and polarized into TAMs by different signaling molecules in TME. Most TAMs display M2 phenotype, which is called M2-type macrophage.

TAMs can promote the proliferation, invasion and metastasis of tumor cells, promote tumor angiogenesis, inhibit T cell-mediated anti-tumor immune response and regulate tumor drug resistance. TAMs can directly play a role in promoting the proliferation of tumor cells by secreting epidermal growth factor (EGF), transforming growth factor beta (TGF-0), platelet derived growth factor (PDGF) and vascular endothelial growth factor (VEGF), and the like. TAMs inhibit the phagocytosis of macrophages by expressing molecules such as programmed death-1 (PD-1) and signal regulatory protein alpha (SIRPα), and mediate tumor immune escape. Recently, researchers found that there was a C1q+ macrophage subpopulation in tumor-related macrophages, and the disorder of this subpopulation m6A methylase METTL14 resulted in the increased expression of EBI3, and promoted the dysfunction of tumor-infiltrating CD8+ T cells, thus inhibiting the anti-tumor immune response. Furthermore, TAMs are capable of inhibiting the antitumor effects of chemotherapeutic agents, including etoposide, gemcitabine, and CMF regimens (cyclophosphamide, methotrexate, and 5-fluorouracil). Multiple studies have confirmed that the high infiltration density of TAMs in tumor tissues is closely related to the poor prognosis of cancer patients.

CD206 is highly expressed in M2-type macrophages. CD206 can not only be used as a marker of M2-type macrophage activation, but also help it to exert immunosuppressive activity. A novel intron microRNA (miRNA), called miR-511-3p, was identified in the human and mouse Mrc1 genes. The miR-511-3p is a negative regulator of TAMs tumor-promoting activity, and its forced expression in hematopoietic stem cells has an important impact on the tumor angiogenesis system and can further inhibit the growth of tumors.

A recent study has found that the activation of CD206, a tumor-associated macrophage surface receptor, can enhance the anti-tumor immune response. Jaynes et al. constructed a 10-mer amphiphilic host defense peptide analog RP-182 that selectively induces conformational transformation of CD206 resulting in phenotypic transformation of TAMs. The researchers first found that RP-182 mediates the activation of M2-type macrophage CD206, which in turn triggers endocytosis, phagocyte-lysosomal formation and autophagy programs. The RP-182-treated mouse bone marrow-derived macrophage phenotype was identified by flow cytometry and showed that M2-type macrophages were reprogrammed to M1-type macrophages after RP-182 activated CD206. In tumor tissue treated with RP-182, there was an increase in M1-type macrophages and a decrease in M2-type macrophages. The antitumor activity of RP-182 has been observed in both mouse pancreatic cancer models and patient-derived xenografts with high CD206 expression. RP-182 has also been shown to be effective when used in combination with chemotherapeutic agents or immunocheckpoint inhibitors in pancreatic cancer. In addition, researchers tested RP-182 in animal models of different cancers and found that it was effective not only for pancreatic cancer but also for other cancers such as colon cancer, breast cancer, prostate cancer and melanoma. This study shows that CD206 can be used as a target for cancer treatment.

2.1 Structure as defined by an siRNA: short (usually 20 to 24 bp) double-stranded RNA (dsRNA) with a phosphorylated 5'-end and a hydroxylated 3'-end with two prominent nucleotides. The nuclease-catalyzed production of siRNA consists of long dsRNA and small hairpin RNA. The siRNA may also be introduced into the cell by transfection. Since in principle any gene can be knocked down by a synthetic siRNA with a complementary sequence, the siRNA is an important tool for validating gene function and drug targeting in the post-genomic era. The siRNA is typically a 21 nucleotide long double strand RNA (dsRNA) with two strands extending two nucleotides beyond the other end at each end of RNA, as shown in FIG. 1. Each strand has a 5' phosphate end and a 3' hydroxyl end. This structure is obtained by the treatment of an enzyme called dicer. The enzyme can cut longer double-stranded RNA or small hairpin RNA into siRNA. In addition, the siRNA may also be introduced via a variety of different transfection technology into the cell, and to a specific gene to produce a specific knockdown effect. Therefore, the complementarity of appropriately tailored siRNA can be used to calibrate genes with known sequences, making siRNA become an important tool for studying gene function and drug target. The siRNA is also similar to miRNA. However, miRNA comes from short stem-loop RNA products, usually silencing genes by inhibiting translation, and has a broader effect specificity, while siRNA usually acts by cutting mRNA before translation and is 100% complementary, so that the target specificity is very strict.

2.2 Induction Edit with siRNA or its Biosynthesis Precursor RNAi

Gene knockdown by transfection of an exogenous siRNA is generally unsatisfactory because the effect is only transient, particularly in rapidly dividing cells. This can be overcome by an expression vector that produces an siRNA. The siRNA sequence is modified to introduce a short loop between that two chains. The resulting transcript is short hairpin RNA (shRNA), which can be processed by Dicer in its usual manner to a successful functional siRNA. A typical transcriptional cassette uses an RNA polymerase III promoter (e.g., U6 or H1) to direct transcription of small RNA (snRNA) (U6 is involved in gene splicing; H1 is an RNase) human RNase P). In theory, the resulting siRNA transcript was then treated by Dicer.

The efficiency of gene knockdown can also be improved by use cell extrusion. The activity of siRNA in RNAi depends largely on its ability to bind to RNA-induced silencing complex (RISC). The binding of duplex siRNA to RISC is followed by the unwinding and cleavage of the sense strand with an endonuclease. The remaining antisense strand-RISC complex can then bind to the target mRNA to initiate transcriptional silencing.

2.3 Post-Transcriptional Gene Silencing Edit

The siRNA-induced post-transcriptional gene silencing began with the assembly of RNA-induced silencing complexes (RISC). The complex silences certain gene expression by cleaving mRNA molecules encoding target genes. To begin this process, one of the two siRNA strands (the leader strand) will be loaded into the RISC while the other strand, the passenger strand, is degraded. Some Dicer enzymes may be responsible for loading the boot chain into the RISC. The siRNA then scans and directs the RISC to fully complementary sequences on the mRNA molecule. Cleavage of the mRNA molecule is thought to be catalyzed by the Piwi domain of the Argonaute protein of RISC. The mRNA molecule was then precisely cleaved by cleaving the phosphodiester bond between the target nucleotides paired with siRNA residues 10 and 11, counting from the 5'-end. This cleavage result in further degradation of that mRNA fragment by the cellular nucleic acid exonuclease. The 5' fragment was degraded from its 3'-end by exosomes, while the 3' fragment was degraded from its 5'-end by 5'-3' exonuclease 1 (XRN1). Dissociation of the target mRNA chain from the RISC after cleavage allows more mRNA to be silenced. This dissociation process was probably promoted by external factors driven by ATP hydrolysis. Sometimes cleavage of the target mRNA molecule does not occur. In some cases, endonuclease cleavage of the phosphodiester backbone can be inhibited by mismatches of siRNA and target mRNA near the cleavage site. At other times, the Argonaute protein of RISC lacks endonuclease activity even when the target mRNA and siRNA are fully paired. In this case, gene expression will be silenced by the miRNA induction mechanism. A simplified version of the Ping-Pong method involving the cleavage of the 3' and 5'-ends of piRNA by protein Aubergine (Aub) and Argonaute-3 (Ago3). Piwi-interacting RNA is responsible for transposon silencing, not siRNAs.

However, whether siRNA can be used to inhibit TAMs and thus inhibit the migration and proliferation of tumor cells is still unknown.

SUMMARY

In order to solve the above problems, it is an object of the present invention to provide an siRNA specifically binding to CD206 of M2 macrophages, which inhibits expression of CD206 by binding to CD206-specific mRNA of M2 macrophages, thereby inhibiting proliferation of M2 macrophages, and further inhibiting proliferation and migration of tumor cells.

To achieve the above object, the present invention provides an siRNA targeting M2 macrophage CD206, which is:
1) one or more of siRNA-1, siRNA-2, siRNA-3, siRNA-4, siRNA-5, siRNA-6; or,
2) one or more of siRNA-7, siRNA-8, siRNA-9, siRNA-10, siRNA-11, siRNA-12;

wherein
in the siRNA-1, the sense strand nucleotide sequence is shown as SEQ ID NO: 1, and the antisense strand nucleotide sequence is shown as SEQ ID NO: 2;
in the siRNA-2, the sense strand nucleotide sequence is shown as SEQ ID NO: 3, and the antisense strand nucleotide sequence is shown as SEQ ID NO: 4;
in the siRNA-3, the sense strand nucleotide sequence is shown as SEQ ID NO: 5, and the antisense strand nucleotide sequence is shown as SEQ ID NO: 6;
in the siRNA-4, the sense strand nucleotide sequence is shown as SEQ ID NO: 7, and the antisense strand nucleotide sequence is shown as SEQ ID NO: 8;
in the siRNA-5, the sense strand nucleotide sequence is shown as SEQ ID NO: 9, and the antisense strand nucleotide sequence is shown as SEQ ID NO: 10;
in the siRNA-6, the sense strand nucleotide sequence is shown as SEQ ID NO: 11, and the antisense strand nucleotide sequence is shown as SEQ ID NO: 12;
in the siRNA-7, the sense strand nucleotide sequence is shown as SEQ ID NO: 13, and the antisense strand nucleotide sequence is shown as SEQ ID NO: 14;
in the siRNA-8, the sense strand nucleotide sequence is shown as SEQ ID NO: 15, and the antisense strand nucleotide sequence is shown as SEQ ID NO: 16;
in the siRNA-9, the sense strand nucleotide sequence is shown as SEQ ID NO: 17, and the antisense strand nucleotide sequence is shown as SEQ ID NO: 18;
in the siRNA-10, the sense strand nucleotide sequence is shown as SEQ ID NO: 19, and the antisense strand nucleotide sequence is shown as SEQ ID NO: 20;
in the siRNA-11, the sense strand nucleotide sequence is shown as SEQ ID NO: 21, and the antisense strand nucleotide sequence is shown as SEQ ID NO: 22;
in the siRNA-12, the sense strand nucleotide sequence is shown as SEQ ID NO: 23, and the antisense strand nucleotide sequence is shown as SEQ ID NO: 24.

The invention also provides the use of the above-mentioned siRNA in manufacturing a medicament for inhibiting the growth or proliferation of tumor cells.

Preferably, the tumor cells are glioma cells, breast cancer cells, cervical cancer cells, lung cancer cells, gastric cancer cells, colorectal cancer cells, duodenal cancer cells, leukemia cells, prostate cancer cells, endometrial cancer cells, thyroid cancer cells, lymphoma cells, pancreatic cancer cells, liver cancer cells, melanoma cells, skin cancer cells, pituitary tumor cells, germ cell tumor cells, meningioma cells, meningeal cancer cells, glioblastoma cells, astrocytoma cells, oligodendroglioma cells, oligoastrocytoma cells, ependymoma cells, choroid plexus papilloma cells, choroid plexus cancer cells, chordoma cells, ganglioneuroma cells, olfactory neuroblastoma cells, sympathetic nervous system neuroblastoma cells, pinealocytoma cells, pinealoblastoma cells, medulloblastoma cells, trigeminal schwannoma cells, facial acoustic neuroma cells, jugular bulb cells, hemangioblastoma cells, craniopharyngioma cells or granulocytoma cells.

The invention has the beneficial effects that:

The invention provides an siRNA specifically binding to CD206 of M2 macrophage, which reduces the expression of CD206 by specifically binding to mRNA of CD206 of M2 macrophages, thereby reducing the expression of molecule and proteins related to M2 macrophages and further inhibiting the proliferation and migration of tumor cells.

DETAILED DESCRIPTION OF THE EMBODIMENTS

Figure 1:
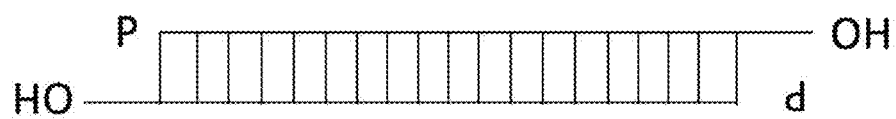
FIG. 1 is a schematic diagram of the basic structure of siRNA.

In order to facilitate the understanding of the present invention, a more complete description of the invention will now be rendered by reference to examples. The preferred examples are set forth below. This invention may, however, be embodied in many different forms and should not be limited to the examples described herein. These examples are provided so that the understanding to the disclosure will be thorough and complete. It should be understood that the experimental method for which specific conditions are not indicated in the following examples is generally carried out under conventional conditions, such as those described in Sambrook et al., Molecular Cloning: Laboratory Manual (New York: Cold Spring Harbor Laboratory Press, 1989), or as proposed by the manufacturer. The various reagents commonly used in the examples are commercially available.

Material

1. Human-derived breast cancer cell line MCF-7, human-derived monocyte cell line THP-1, mouse-derived breast cancer cell line 4T1, and mouse-derived breast cancer cell line 4T1-luc (4T1-luc is a mouse breast cancer cell line expressing fluorescent markers) were purchased from the cell bank of the Type Culture Collection Committee of China Academy of Sciences.
2. RPMI1640 Complete Medium was purchased from US, ThermoFisher Scientific, product number: 31800022
3. PMA was purchased from US, Sigma-Aldrich LLC, product number: P1585.
4. LPS was purchased from US, Sigma-Aldrich LLC, product number: L2630.
5. IFNγ was purchased from US, PeproTech, product number: 300-02
6. IL-4 was purchased from US, PeproTech, product number: 200-04
7. IL-13 was purchased from US, PeproTech, product number: 200-13
8. riboFECT™ CP Transfection Kit was purchased from Guangzhou Ruibo Biotechnology Co., Ltd., product number: C10511-05.
9. Primary Antibody was purchased from US, Abcam, product number: ab64693.
10. Secondary Antibody was purchased from Beijing Zhongshan Jinqiao Biotechnology Co., Ltd., product number: ZF-0316
11. Fluorescent Secondary Antibody was purchased from Beijing Zhongshan Jinqiao Biotechnology Co., Ltd., product number: ZF-0311.
12. Mouse ICR was purchased from Animal Department of Peking University Medical School.
13. Trizol reagent was purchased from US, ThermoFisher Scientific, product number: 15596018.
14. RevertAid RT Reverse Transcription Kit was purchased from US, ThermoFisher Scientific, product number: K1691.
15. PowerUp™ SYBR™ Green Premix Solution was purchased from US, ThermoFisher Scientific, product number: A25742.

Example 1

The appropriate siRNA sequences were searched and found in Genbank of the gene pool based on the human CD206 gene. According to the Genbank search sequence NM_002438.4, six DNA target sequences were obtained through analysis, as shown in Table 1:

TABLE 1

| | DNA target sequence | |
|---|---|---|
| | Sequence ID No. | Sequence (5'→3') |
| 1 | SEQ ID NO: 25 | GTGTGACCATGTATTCAAA |
| 2 | SEQ ID NO: 26 | CAACCAGGATGCCGAATCA |
| 3 | SEQ ID NO: 27 | GGATCGCCCTGAACAGTAA |
| 4 | SEQ ID NO: 28 | GTAACTTGACTGATAATCA |
| 5 | SEQ ID NO: 29 | GATTGTTCAGAAATGTTGA |
| 6 | SEQ ID NO: 30 | GGCTTAAATGACATTAAGA |

Using the above six DNA target sequences as templates, corresponding siRNAs were chemically synthesized and TT was added to the sense strand and the 3'-end of the antisense strand of each siRNA to increase the stability of the siRNA.

The siRNA sequences with the 3'-end TT are shown in Table 2:

TABLE 2 siRNA sequence

| | Sequence Name | Location | Sequence (5'→3') |
|---|---|---|---|
| 1 | siRNA-1 | Sense strand (SEQ ID NO: 1) | GUGUGACCAUGUAUUCAAATT |
| | | Antisense strand (SEQ ID NO: 2) | UUUGAAUACAUGGUCACACTT |
| 2 | siRNA-2 | Sense strand (SEQ ID NO: 3) | CAACCAGGAUGCCGAAUCAUT |
| | | Antisense strand (SEQ ID NO: 4) | UGAUUCGGCAUCCUGGUUGTT |
| 3 | siRNA-3 | Sense strand (SEQ ID NO: 5) | GGAUCGCCCUGAACAGUAATT |
| | | Antisense strand (SEQ ID NO: 6) | UUACUGUUCAGGGCGAUCCTT |
| 4 | siRNA-4 | Sense strand (SEQ ID NO: 7) | GUAACUUGACUGAUAAUCATT |
| | | Antisense strand (SEQ ID NO: 8) | UGAUUAUCAGUCAAGUUACTT |
| 5 | siRNA-5 | Sense strand (SEQ ID NO: 9) | GAUUGUUCAGAAAUGUUGATT |
| | | Antisense strand (SEQ ID NO: 10) | UCAACAUUUCUGAACAAUCTT |
| 6 | siRNA-6 | Sense strand (SEQ ID NO: 11) | GGCUUAAAUGACAUUAAGATT |
| | | Antisense strand (SEQ ID NO: 12) | UCUUAAUGUCAUUUAAGCCTT |

Beijing Qingke Biotechnology Co., Ltd. was entrusted to chemically synthesize the above siRNA-1 to siRNA-6. For the convenience of subsequent detection, FAM fluorescence labeling was performed on the 5'-ends of both the sense strand and the antisense strand of siRNA-1 to siRNA-6 using a conventional labeling method. At the same time, the company provided a negative control siRNA-NC without homology based on target sequences.

Example 2

The human siRNA-1 to siRNA-6 and siRNA-NC prepared in Example 1 were transfected into THP1-induced M2 macrophages by using the riboFECT™ CP Transfection Kit, and the expression level of CD206 and the expression changes of downstream related molecules in M2 macrophages were detected.

1. M2 Macrophage Induction
   1) Human monocyte cell line THP-1 cells were inoculated into a culture flask containing RPMI1640 Complete Medium for culture, and stably culturing for 2 to 4 generations;
   2) THP-1 cells were collected into a 15 mL centrifuge tube, centrifuged at 800 rpm for 3 min, and the cell density was adjusted to $5*10^5$/mL. Then the cells were inoculated into a new culture dish containing RPMI1640 Complete Medium, and PMA with a final concentration of 100 ng/mL was added for culture for 24 h. Then, whether THP-1 cells adhered to the wall completely was observed under a microscope. Adherence completely proved that they had differentiated into M0 macrophages.
   3) The medium was removed, and RPMI1640 Complete Medium containing 20 ng/mL LPS and 20 ng/mL IFNγ was added for culture for 48 h, to induce M1 macrophages. Then RPMI1640 Complete Medium containing 20 ng/mL IL-4 and IL-13 was added for culture for 48 h to obtain M2 macrophages.

2. qPCR Assay of Expression of CD206 and Downstream Related Molecules in M2 Macrophages siRNA-1, siRNA-2, siRNA-3, siRNA-4, siRNA-5, siRNA-6 and siRNA-NC were respectively transfected into M2 macrophages according to the instructions of the riboFECT™ CP Transfection Kit, and cell culture plates (6-well plates) were placed in an incubator at 37° C., 5% $CO_2$ and saturated humidity for 24-72 h after transfection.

1) RNA Extraction
      Cell samples transfected with siRNA-1, siRNA-2, siRNA-3, siRNA-4, siRNA-5, siRNA-6, and siRNA-NC were each subjected to 3 parallel runs.
      a. The original culture medium in the cell culture plate was removed. PBS was added. The culture dish was gently shaken, and the culture dish was cleaned for 2 to 3 times.
      b. 1 mL Trizol reagent was added into each well of the cell culture plate, and it was allowed to stand for 5 min at ambient temperature. After being blown and sucked for several times, the cell suspension was collected into 1.5 mL centrifuge tubes (1 mL per tube) in (1).
      c. 200 μL of trichloromethane was added to each tube, shaked vigorously for 15 s, and allowed to stand at ambient temperature for 2-3 min.
      d. The above centrifuge tube was placed in a high-speed low-temperature centrifuge. The tube was centrifuged for 15 min under the condition of centrifugal speed of 10000 g at 4° C. The supernatant was carefully sucked and transferred to another clean 1.5 mL centrifuge tube. An equal volume (about 600 μL) of isopropanol was added and the tube was allowed to stand for 10 min at ambient temperature.
      f. The above centrifuge tube was placed in a high-speed low-temperature centrifuge, and centrifuged at 4° C. and 10000 g for 10 min. The supernatant was removed and 1 mL of pre-cooled 80% ethanol was added to wash the precipitate.
      g. The above centrifuge tube was placed in a high-speed low-temperature centrifuge, and centrifuged at 4° C. and 7500 g for 5 min, and the supernatant was removed.
      h. Step (7) was repeated.
      i. After centrifugation, the supernatant was removed and dried in air for 5-10 min to fully volatilize ethanol.
      j. 30-50 μL RNAase-free dd$H_2O$ was added into the centrifuge tube, and mixed repeatedly with blowing to obtain total RNA.
      k. 1-2 μL samples were taken from each group to determine the concentration using an ultra-micro spectrophotometer. The concentration was appropriate for subsequent experiments or it could be stored in the −80° C. ultra-low temperature refrigerator.

2) RNA Reverse Transcription
      RNA reverse transcription was performed using the RevertAid RT Kit with the reagents included in the RevertAid RT Kit.

a. RNA reverse transcription reaction system 1 was prepared as shown in Table 3.

TABLE 3

RNA reverse transcription reaction system 1

| Reagents | Content |
| --- | --- |
| Total RNA | 0.1 ng-5 µg |
| Random primer | 1 µL |
| RNase-free ddH2O | Make up to 12 µL | b. The components were gently blown, sucked and mixed, instantaneously centrifuged, incubated in a metal bath at 65° C. for 5 min, and placed on ice for 2 min.

c. RNA reverse transcription reaction system 2 was prepared as shown in Table 4.

TABLE 4

RNA reverse transcription reaction system 2

| Reagents | Content |
| --- | --- |
| 5 × Reaction Buffer | 4 µL |
| dNTP Mix | 2 µL |
| RiboLock RNase inhibitor | 1 µL |
| RevertAid reverse transcriptase | 1 µL | d. RNA reverse transcription reaction system 2 was added into RNA reverse transcription reaction system 1, mixed by gentle blowing and suction, and put into a PCR instrument after instantaneous centrifugation. Reaction condition was: 25° C., 5 min; 42° C., 60 min; 70° C., 5 min. The reaction was cooled at 4° C. to obtain cDNA template.

The cDNA samples after reverse transcription could be used for subsequent qPCR experiments or stored in the −80° C. ultra-low temperature refrigerator.

3) qPCR qPCR reaction system was prepared and shown in Table 5.

TABLE 5 qPCR reaction system

| Reagents | Content |
| --- | --- |
| 2 × PowerUp ™ SYBR ™ Green Premix Solution | 10 µL |
| RNase-free ddH2O | 7 µL |
| Sense strand | 1 µL |
| Antisense strand | 1 µL |
| cDNA templates | 1 µL |

Among others, the sense strand was the sense strand of siRNA-1 to siRNA-6 or siRNA-NC, and the antisense strand was the antisense strand of siRNA-1 to siRNA-6 or siRNA-NC.

The above components were mixed by gentle blowing and suction, and placed in the StepOne™ Real-Time PCR instrument after instantaneous centrifugation. Reaction conditions are shown in Table 6.

TABLE 6 qPCR reaction condition (Tm ≥ 60° C.)

Figure 2:
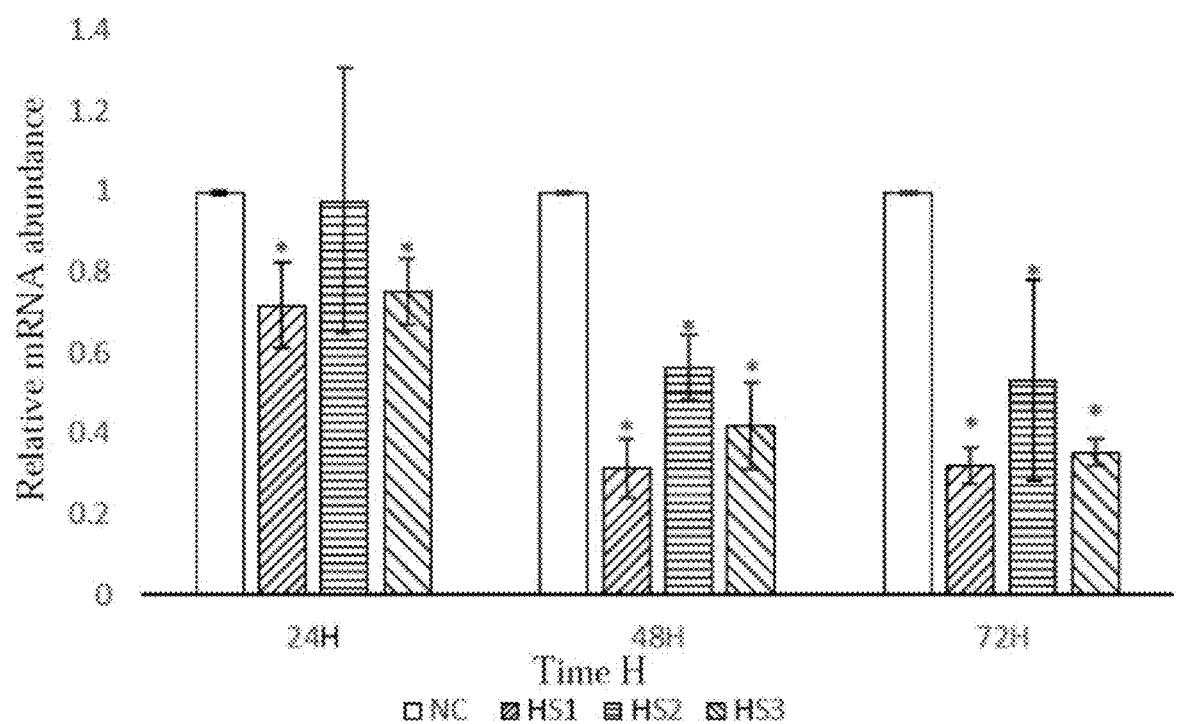
FIG. 2 is a qPCR statistical diagram of the expression of THP1-induced M2 cell CD206 by human siRNA-1 to siRNA-3 transfection as provided by the present invention.
Figure 3:
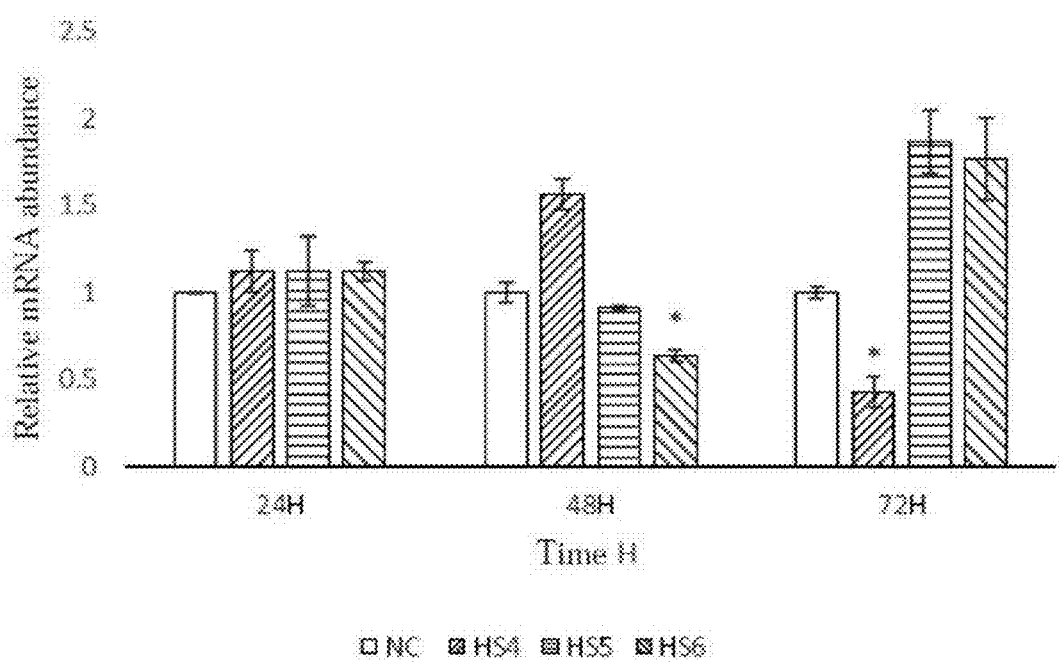
FIG. 3 is a qPCR statistical diagram of the expression of THP1-induced M2 cell CD206 by human siRNA-4 to siRNA-6 transfection as provided by the present invention.

| Step | Temperature | Time | Cycle Numbers |
| --- | --- | --- | --- |
| UDG activation | 50° C. | 2 min | 1 |
| Dual-Lock DNA polymerase | 95° C. | 2 min | 1 |
| Denature | 95° C. | 15 s | 40 |
| Annealing/Extension | 60° C. | 1 min | | qPCR was used to detect the expression of CD206 in M-M2 macrophages induced with THP1 as interfered with siRNA. The results are shown in FIG. 2 and FIG. 3, wherein HS1 to HS6 respectively correspond to the PCR products after transfection of siRNA-1 to siRNA-6. NC is the PCR product after transfection of siRNA-NC, which is the negative control. It shows the expression of CD206 at 24 h, 48 h and 72 h after interference. Experimental data were expressed as mean±standard deviation (means±SD) (n=3). *: compared with NC group, P<0.05; : compared with NC group, P<0.01; *: compared with NC group, P<0.001; ****: P<0.0001 compared with NC group.

As shown in FIG. 2 and FIG. 3, siRNA-1 to siRNA-6 can all inhibit the expression of CD206. Among them, NC was used as the negative control to display HS1-HS6, and the significant difference at different time points was due to the binding of different siRNA to different parts of the gene, which might result in different inhibition effects, different suitable time and different action intensity. Therefore, at the same time point, the inhibition effects of different siRNAs were different. The following experiments were conducted with siRNA-1 as a representation.

3. Immunofluorescence Detection of Protein Expression:
  1) The M2 macrophages transfected with siRNA-1 for 24 h, 48 h and 72 h were collected, adjusted to cell density of 1*10$^5$/mL, and inoculated in confocal dish. The non-transfected M2 macrophages were used as the negative control group (NC).
  2) After the cells adhered to the wall, the medium was removed, and PBS was added, and the mixture was shaken in a horizontal decolorizing shaker for 5 min and washed for three times.
  3) Fixation: 4% paraformaldehyde was added, and the mixture was allowed to stand for 10 min at ambient temperature. After fixation, the mixture was washed for three times with PBS.
  4) Blocking: 5% BSA prepared with PBS was added and blocked in a 37° C. incubator for 30 min.
  5) Primary antibody reaction: After the blocking solution was removed, 200 µL (1:500 dilution) of the corresponding primary antibody was added to each group. An equal volume of 5% BSA was added to the negative control group and incubated overnight at 4° C.
  6) Secondary antibody reaction: The primary antibody was sucked and removed, followed by the addition of PBS, horizontal shaking with a decolorizing shaker for 5 min and washing for three times. The corresponding fluorescent secondary antibodies (1:500 dilution) were added to each group. The negative control group was added with an equal volume of secondary antibodies and incubated in a 37° C. incubator in the dark for 1 h.
  7) DAPI: the secondary antibody was sucked and removed, and PBS was added for washing for three times. Then 200 µL DAPI was added and incubated at ambient temperature for 20 min. The DAPI was sucked and removed, and the reaction was washed 3 times with PBS.

Figure 4:
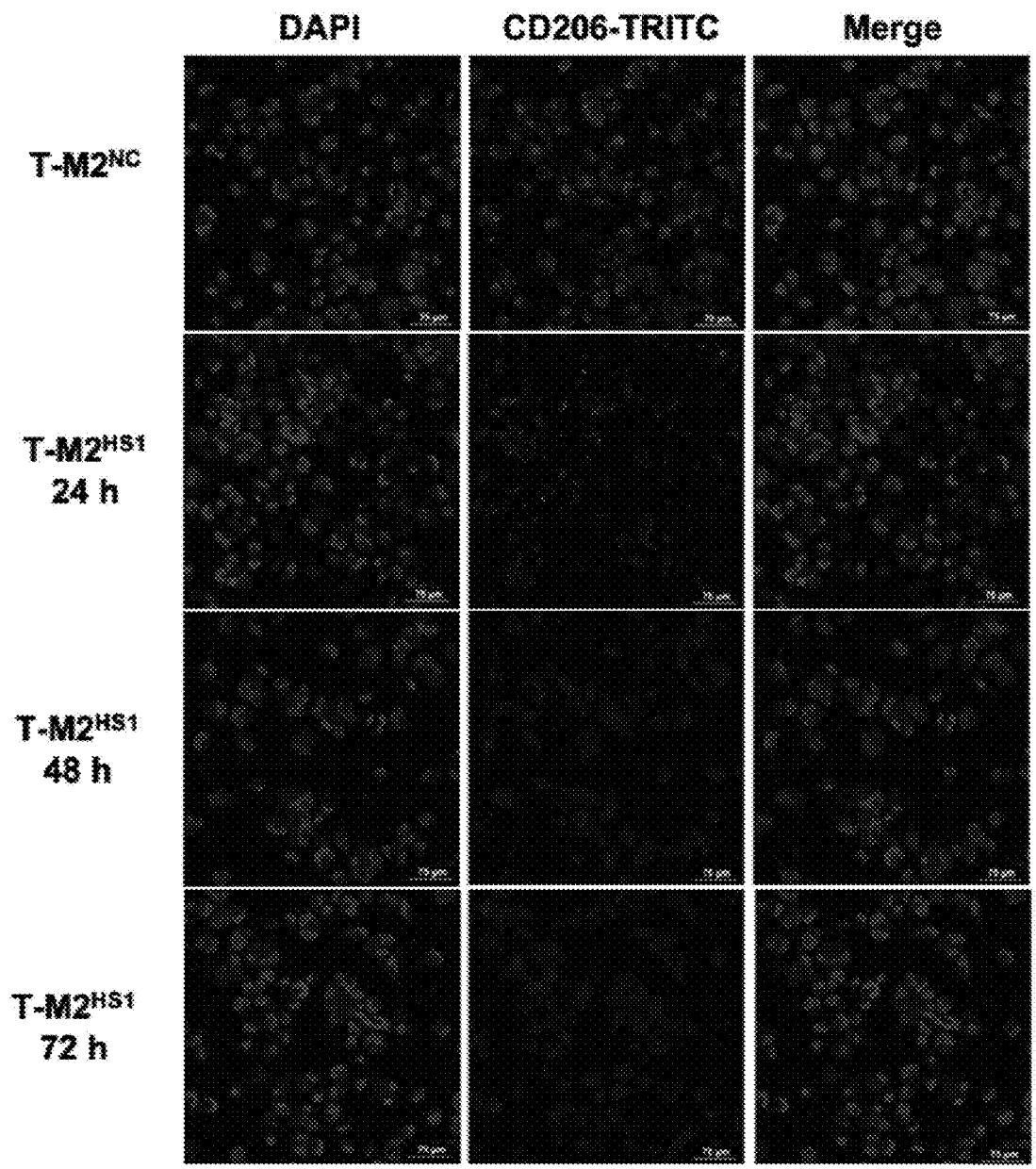
FIG. 4 is a fluorescence photograph showing the expression of THP1-induced M2 cell CD206 by human siRNA-1 transfection as provided by the present invention.

The luminescence of cells in each group was observed under a Leica laser confocal microscope and photographed. Taking siRNA-1 as an example, the results are shown in FIG. 4, wherein DAPI represents the blue fluorescence of nuclear marker DAPI, and CD206-TRITC represents the red fluorescence of CD206 marker TRITC, and Merge represents the coating superposition result of DAPI and CD206-TRITC. T-M2$^{NC}$ is the negative control group, and T-M2$^{HS1}$ 24 h represents siRNA-1 treatment for 24 hours, and T-M2$^{HS1}$ 48 h represents siRNA-1 treatment for 48 hours, and T-M2$^{HS1}$ 72 h represents siRNA-1 treatment for 72 hours.

As can be seen from FIG. 4, when the fluorescence-labeled siRNA-1 was transfected into human M2 macrophages, the expression level of CD206 in M2 macrophages was significantly lower than that in the blank control group and the negative control group. When treated for 72 hours, the expression of CD206 was substantially not observed, which indicates that the siRNA-1 as provided by the invention can effectively silence the expression of CD206.

Example 3

According to the mouse CD206 gene, an appropriate siRNA sequence was searched and found in Genbank. According to the Genbank search sequence NM_008625.2, six DNA target sequences were obtained through analysis, as shown in Table 7.

TABLE 7

DNA target sequence

| | Sequence ID No. | Sequence (5'→3') |
|---|---|---|
| 1 | SEQ ID NO: 31 | GCAAGCATTTGTTACCTAT |
| 2 | SEQ ID NO: 32 | GCATGAAGCAGAGACATAT |
| 3 | SEQ ID NO: 33 | GTGGTATGCAGACTGCACC |
| 4 | SEQ ID NO: 34 | GGCATTCTTTACCAGATAA |
| 5 | SEQ ID NO: 35 | GGCTTACGGTGAACCAAAT |
| 6 | SEQ ID NO: 36 | CCACTGACTACGACAAAGA |

Using the above six DNA target sequences as templates, corresponding siRNAs were chemically synthesized and TT was added to the sense strand and the 3'-end of the antisense strand of each siRNA to increase the stability of the siRNA.

The siRNA sequences with the 3'-end TT are shown in Table 8:

TABLE 8 siRNA sequence

| | Sequence Name | Location | Sequence (5'→3') |
|---|---|---|---|
| 1 | siRNA-7 | Sense strand (SEQ ID NO: 13) | GCAAGCAUUUGUUACCUAUTT |
| | | Antisense strand (SEQ ID NO: 14) | AUAGGUAACAAAUGCUUGCTT |

TABLE 8-continued siRNA sequence

| | Sequence Name | Location | Sequence (5'→3') |
|---|---|---|---|
| 2 | siRNA-8 | Sense strand (SEQ ID NO: 15) | GCAUGAAGCAGAGACAUAUTT |
| | | Antisense strand (SEQ ID NO: 16) | AUAUGUCUCUGCUUCAUGCTT |
| 3 | siRNA-9 | Sense strand (SEQ ID NO: 17) | GUGGUAUGCAGACUGCACCTT |
| | | Antisense strand (SEQ ID NO: 18) | GGUGCAGUCUGCAUACCACTT |
| 4 | siRNA-10 | Sense strand (SEQ ID NO: 19) | GGCAUUCUUUACCAGAUAATT |
| | | Antisense strand (SEQ ID NO: 20) | UUAUCUGGUAAAGAAUGCCTT |
| 5 | siRNA-11 | Sense strand (SEQ ID NO: 21) | GGCUUACGGUGAACCAAAUTT |
| | | Antisense strand (SEQ ID NO: 22) | AUUUGGUUCACCGUAAGCCTT |
| 6 | siRNA-12 | Sense strand (SEQ ID NO: 23) | CCACUGACUACGACAAAGATT |
| | | Antisense strand (SEQ ID NO: 24) | UCUUUGUCGUAGUCAGUGGTT |

Beijing Qingke Biotechnology Co., Ltd. was entrusted to chemically synthesize the above siRNA-7 to siRNA-12. For the convenience of subsequent detection, FAM fluorescence labeling was also performed on the 5'-ends of both the sense strand and the antisense strand of siRNA-1 to siRNA-6 using a conventional labeling method. In addition, the siRNA having the same sequence without FAM label was also synthesized. At the same time, the company provided a negative control siRNA-NC without homology based on target sequences.

Example 4

The human siRNA-7 to siRNA-12 and siRNA-NC prepared in Example 3 were transfected into induced bone marrow M2 macrophages by using the riboFECT™ CP Transfection Kit, and the expression level of CD206 and the expression changes of downstream related molecules in M2 macrophages were detected.

1. Preparation of Mouse-Derived M2 Macrophages:
   (1) Six to eight weeks old BALB/c mice were selected and sacrificed by cervical dislocation and immersed in 75% alcohol for 5 minutes.
   (2) The skin at the abdominal groove of the mouse was cut with sterile ophthalmic scissors and the hind limbs of the mouse were separated. The scissors were cut upward along the root of the femoral head. It was paid attention not to cut the femur. The muscles were carefully removed and the clean bones were immersed in PBS.
   (3) The removed bones were immersed in 75% alcohol for 2 min and then washed twice with PBS.
   (4) Two ends of the bone were cut with an ophthalmic scissors, and PBS was sucked through a 5 mL syringe, inserted into the bone marrow cavity to wash the cells into a 15 mL centrifuge tube, and repeatedly and gently blew and sucked to disperse the cells.

(5) The cell suspension was filtered through a 70 μm (200-mesh) cell filter into a new 15 mL centrifuge tube and centrifuged at 1000 rpm for 10 min.

(6) The supernatant was removed, and 2-3 mL of erythrocyte lysis buffer was added for re-suspension, followed by lysis at 4° C. for 10 min.

(7) DMEM Complete Medium was added to 10 mL to stop erythrocyte lysis, and the samples were centrifuged at 1500 rpm for 5 min.

(8) The cells were suspended in DMEM Complete Medium containing mMCSF with a final concentration of 50 ng/mL, and then counted. The cell concentration was adjusted and inoculated into 6- or 24-well plates.

(9) The fluid was replaced on the 3rd day of plate inoculation, and mature macrophages, i.e., M-M0 macrophages, could be harvested on the 7th day.

(10) The mature macrophages were polarized, and the original medium was removed. Then DMEM Complete Medium containing LPS and IFNγ with a final concentration of 100 ng/mL was added for culture for 24 h, in order to obtain the M-M1 macrophages. M-M2 macrophages were obtained by culturing in DMEM Complete Medium containing IL-4 with a final concentration of 20 ng/mL for 24 h.

2. qPCR Assay is Used to Detect the Expression Level of CD206 in Mouse-Derived M2 Macrophages.

The mouse siRNA-7, siRNA-8, siRNA-9, siRNA-10, siRNA-11, siRNA-12, and siRNA-NC were respectively transfected into M2 macrophages according to the instructions of the riboFECT™ CP Transfection Kit, and cell culture plates were placed in an incubator at 37° C., 5% $CO_2$ and saturated humidity for 24-72 h after transfection. Expressions of CD206 in mouse M2 macrophage were detected by qPCR.

Figure 5:
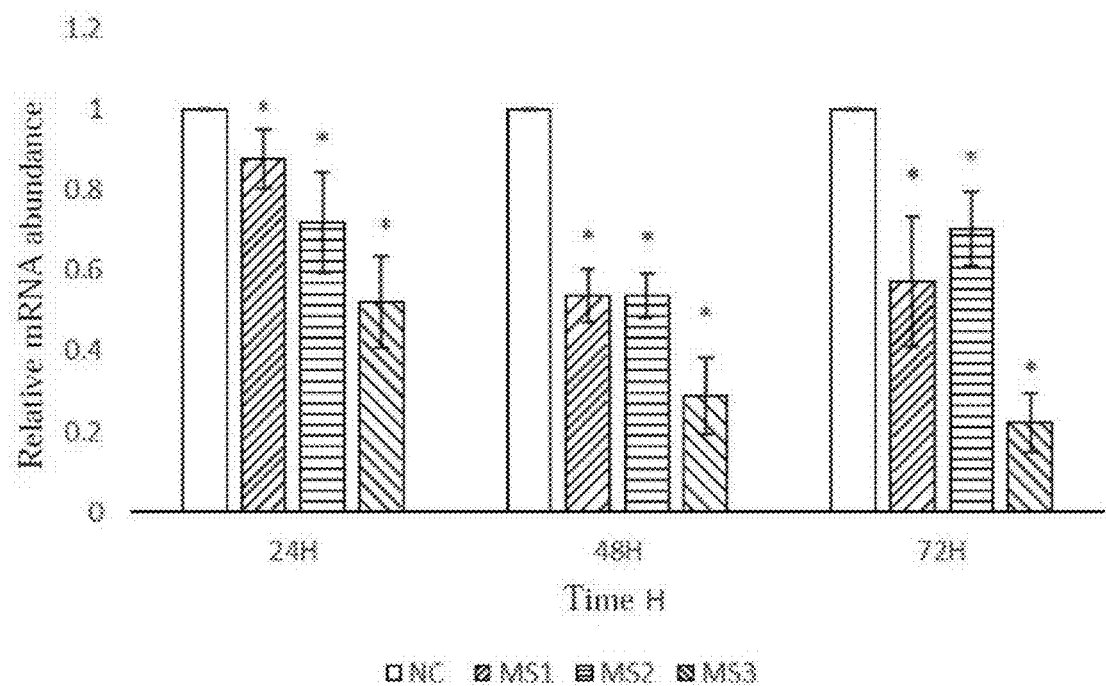
FIG. 5 is a qPCR statistical diagram of the expression of mouse-derived M2 cell CD206 by human siRNA-7 to siRNA-9 transfection as provided by the present invention.
Figure 6:
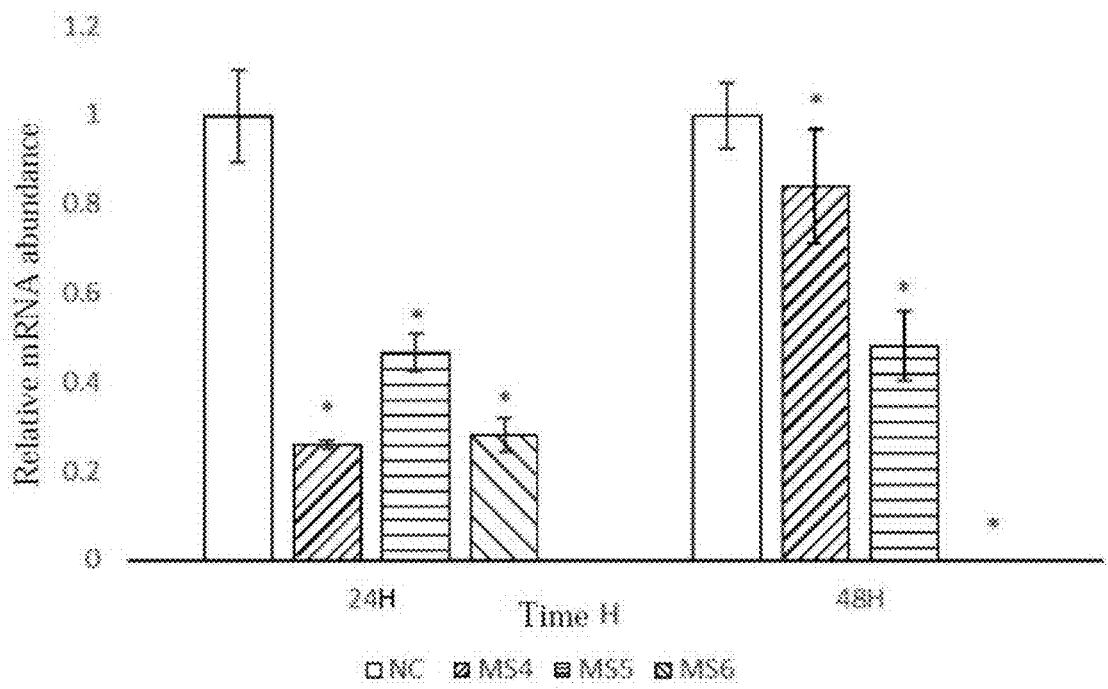
FIG. 6 is a qPCR statistical diagram of the expression of mouse-derived M2 cell CD206 by human siRNA-10 to siRNA-12 transfection as provided by the present invention.

The specific method was carried out with reference to the qPCR assay section in Example 2.

qPCR was used to detect the expression of CD206 in mouse-derived M2 macrophages as interfered with siRNA. The results are shown in FIG. 5 and FIG. 6, wherein MS1 to MS6 respectively correspond to the PCR products after transfection of siRNA-7 to siRNA-12. NC is the PCR product after transfection of siRNA-NC, which is the negative control. It shows the expression of CD206 at 24 h, 48 h and 72 h after interference. Experimental data were expressed as mean±standard deviation (means±SD) (n=3). *: compared with NC group, P<0.05; : compared with NC group, P<0.01; *: compared with NC group, P<0.001; ****: P<0.0001 compared with NC group.

It can be seen from FIG. 5 and FIG. 6 that siRNA-7 to siRNA-12 all inhibited the expression of CD206. Subsequently, siRNA-9 was used as the representative for subsequent experiments.

3. Immunofluorescence Detection of Protein Expression:

The cells after siRNA-9 transfection were treated in the same manner as in Example 2.

Figure 7:
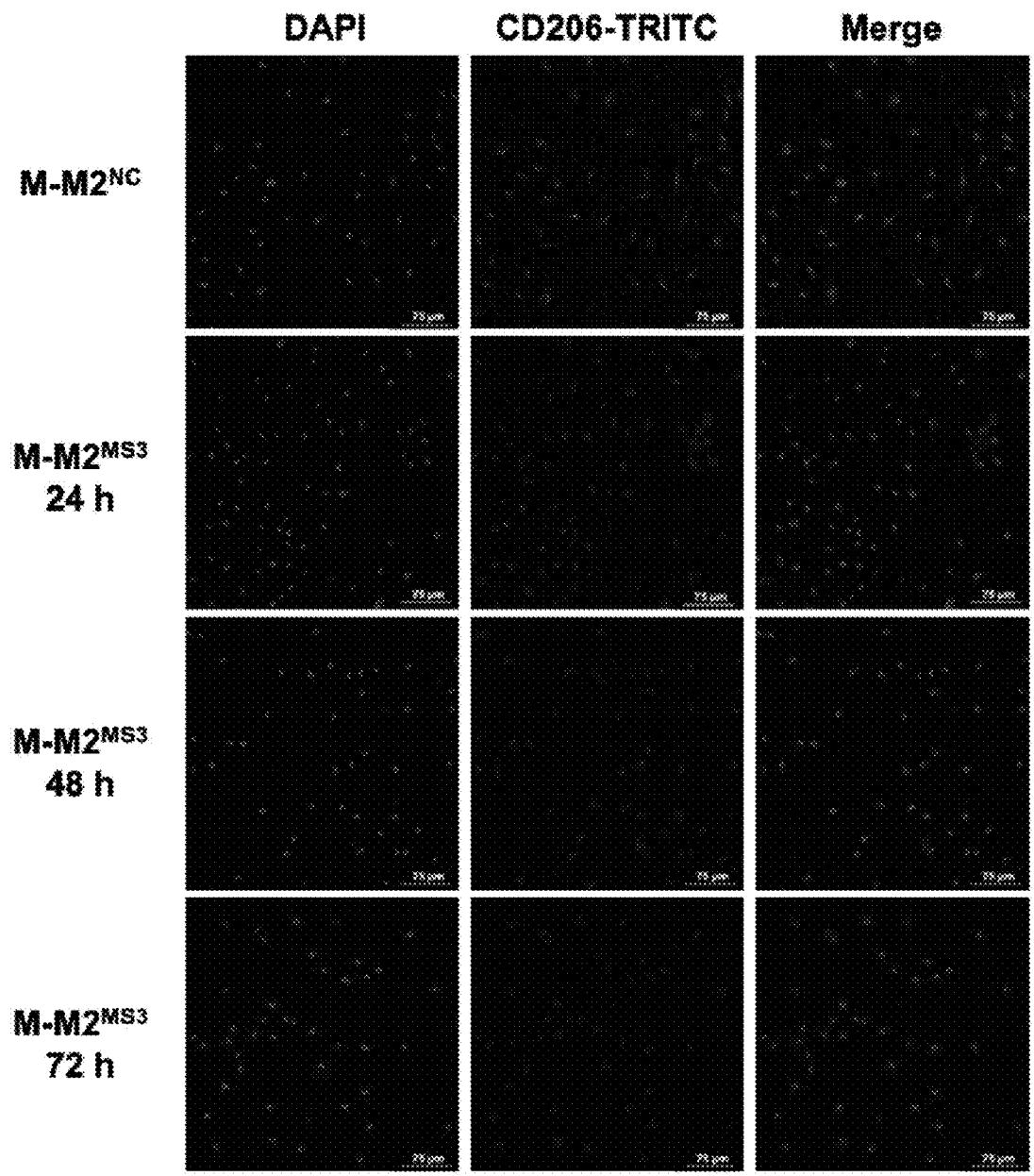
FIG. 7 is a fluorescence photograph showing the expression of mouse-derived M2 cell CD206 by mouse siRNA-9 transfection provided by the present invention.

The luminescence of cells in each group was observed under a Leica laser confocal microscope and photographed. Taking siRNA-9 as an example, the results are shown in FIG. 7, wherein DAPI represents the blue fluorescence of nuclear marker DAPI, and CD206-TRITC represents the red fluorescence of CD206 marker TRITC, and Merge represents the coating superposition result of DAPI and CD206-TRITC. $T-M2^{NC}$ is the negative control group, and $T-M2^{MS3}$ 24 h represents siRNA-9 treatment for 24 hours, and $T-M2^{MS3}$ 48 h represents siRNA-9 treatment for 48 hours, and $T-M2^{MS3}$ 72 h represents siRNA-9 treatment for 72 hours.

As can be seen from FIG. 9, when the fluorescence-labeled siRNA-9 was transfected into mouse-derived M2 macrophages, the expression level of CD206 in M2 macrophages was significantly lower than that in the blank control group and the negative control group. When treated for 72 hours, the expression of CD206 was substantially not observed, which indicates that the siRNA-9 as provided by the invention can effectively silence the expression of CD206.

Example 5 Comprehensive experimental study of the effect of M2 macrophages on breast cancer tumor development and metastasis after CD206 expression down-regulation 1. Effect of M-M2 Macrophage Conditioned Medium with Down-Regulated CD206 Expression on the Growth of Breast Cancer Tumors in Mice To further verify the effect of M2-type macrophages on the growth of breast cancer tumors after CD206 down-regulation, 4T1-luc cells treated with different conditioned media were inoculated into the left forelimb axilla of Balb/c mice, respectively, to construct mouse breast cancer tumor models for research.

Conditioned media M-M2 CM, $M-M2^{NC}$ CM and $M-M2^{MS3}$ CM were prepared respectively. The specific method is as follows:

Preparation of conditioned medium M-M2 CM: The culture supernatant of mouse-derived M2 macrophages (M-M2 macrophages) prepared in Example 4 was collected, centrifuged at 1000 rpm for 10 min, and the fresh complete medium was added in a ratio of 1:1 and mixed evenly to prepare the M-M2 macrophage conditioned medium, which was designated as M-M2 CM.

Preparation of conditioned medium $M-M2^{NC}$ CM: The culture supernatant of -M2 macrophages transfected with siRNA-NC at 48 h in Example 4 was collected, centrifuged at 1000 rpm for 10 min, and the fresh Complete Medium was added in at a ratio of 1:1 and mixed evenly to prepare the $M-M2^{NC}$ macrophage conditioned medium, which was designated as $M-M2^{NC}$ CM.

Preparation of conditioned medium $M-M2^{MS3}$ CM: The culture supernatant of -M2 macrophages transfected with siRNA-9 at 48 h in Example 4 was collected, centrifuged at 1000 rpm for 10 min, and the fresh Complete Medium was added in at a ratio of 1:1 and mixed evenly to prepare the $M-M2^{MS3}$ macrophage conditioned medium, which was designated as $M-M2^{MS3}$ CM.

The conditioned medium 4T1 CM was the supernatant of the culture medium for culturing 4T1-luc cells. The cells were centrifuged at 1000 rpm for 10 min, and the fresh Complete Medium was added in a ratio of 1:1 and mixed evenly to obtain the final product.

The 4T1-luc cells were cultured in the above conditioned medium 4T1 CM, M-M2 CM, $M-M2^{NC}$ CM, and $M-M2^{MS3}$ CM for 12 h, 24 h, 36 h and 48 h, respectively, and then the proliferation ability of 4T1 was detected by CCK8. The results are shown in Table 9 and FIG. 8.

TABLE 9

Effect of CD206 down-regulation on the proliferation activity of 4T1 cells detected by CCK-8

| | Group | | | |
|---|---|---|---|---|
| Time | 4T1 CM | M-M2 CM | M-M2$^{NC}$ CM | M-M2$^{MS3}$ CM |
| 0 h | 1.000 ± 0.000 | 1.000 ± 0.000 | 1.000 ± 0.000 | 1.000 ± 0.000 |
| 12 h | 1.270 ± 0.020 | 1.321 ± 0.021* | 1.363 ± 0.032* | 1.320 ± 0.055 |
| 24 h | 2.038 ± 0.023 | 2.431 ± 0.079** | 2.412 ± 0.097** | 2.185 ± 0.129# |
| 36 h | 3.514 ± 0.014 | 4.074 ± 0.137** | 4.138 ± 0.075*** | 3.627 ± 0.093##&& |
| 48 h | 4.910 ± 0.138 | 5.210 ± 0.141 | 5.261 ± 0.158* | 4.871 ± 0.133#& |

Among them, the data in Table 9 were the ratios of OD values measured at different time points to 0 h, and the data were the mean±standard deviation (means±SD) (n=3). *: compared with 4T1 CM group, P<0.05; : compared with 4T1 CM group, P<0.01; *: P<0.001 as compared with 4T1 CM group; #: compared with M-M2 CM group, P<0.05; ##: P<0.01 compared with M-M2 CM group; &: compared with M-M2$^{NC}$ CM group, p<0.05; &&&: P<0.001 when compared with M-M2$^{NC}$ CM group.

Figure 8:
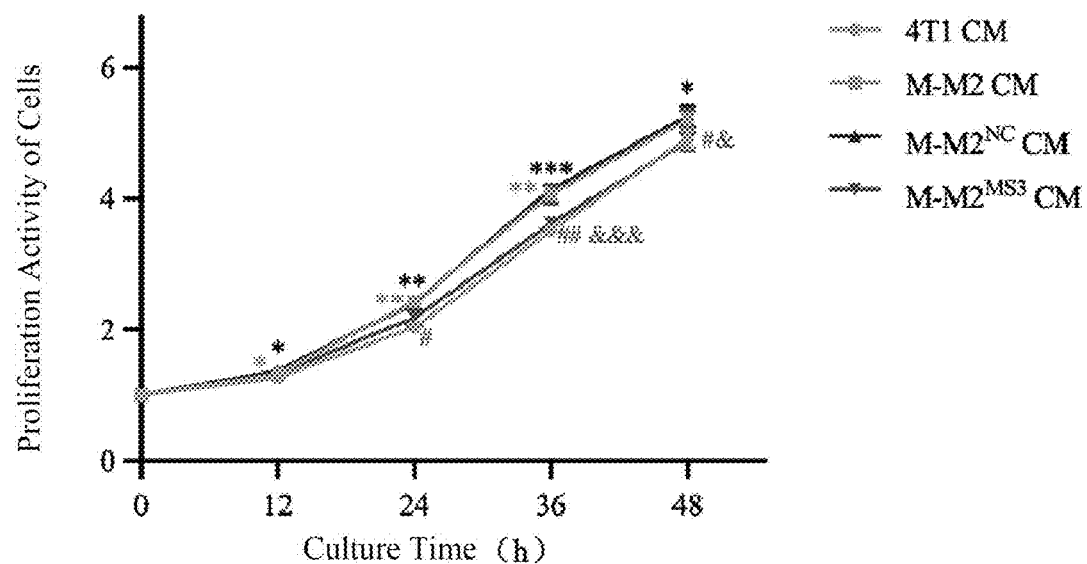
FIG. 8 is a graph showing the results of CCK8 assay on the effects of proliferation activity of 4T1-luc cells in different conditioned media.

As shown in Table 9 and FIG. 8, compared with 4T1 CM group, the cell proliferative activity of the M-M2$^{MS3}$ CM group was not significantly different (p>0.05). The cell proliferative activities of the M-M2 CM and M-M2$^{NC}$ CM groups were enhanced and there was statistical difference (p<0.05). Compared with the M-M2 CM group, the cell proliferative activity of the M-M2$^{MS3}$ CM group was weakened and there was statistical difference (p<0.05). Compared with the M-M2$^{NC}$ CM group, the cell proliferative activity of the M-M2$^{MS3}$ CM group was weakened and there was statistical difference (p<0.05). The results showed that the ability of M-M2 macrophages to promote the proliferation of 4T1 breast cancer cells was weakened after the down-regulation of CD206.

The 4T1-luc cells were collected and the cell density was adjusted to be 2*10$^5$/mL. Then 100 µl cell suspension was inoculated into the axilla of the left forelimb of the mouse and the animals were labeled as the 4T1 group.

The 4T1-luc cells cultured in conditioned medium M-M2 CM, M-M2$^{NC}$ CM, M-M2$^{MS3}$ CM for 24 h were collected, and the cell density was adjusted to 2*10$^5$/mL. 100 µl cell suspension was inoculated into the axilla of the left forelimb of the mouse, and the animals were labeled as 4T1/M-M2 CM, 4T1/M-M2$^{NC}$ CM, 4T1/M-M2$^{MS3}$ CM groups, respectively. After 14 days, the mice were sacrificed by removing the neck. After the dissection and sampling, the tumor mass was weighed and the volume was calculated. The statistics are shown in Table 10.

TABLE 10

Effect of M-M2 macrophage conditioned medium with down-regulated CD206 expression on the growth of breast cancer tumors in mice

| Group | Weight (g) | Volume (mm$^3$) |
|---|---|---|
| 4T1 Group | 1.060 ± 0.108 | 1453.745 ± 348.866 |
| 4T1/M-M2 CM Group | 0.943 ± 0.241 | 1608.323 ± 181.625 |
| 4T1/M-M2$^{NC}$ CM Group | 1.078 ± 0.210 | 1875.828 ± 258.112 |
| 4T1/M-M2$^{MS3}$ CM Group | 0.788 ± 0.256 | 913.996 ± 161.482 |

As shown in Table 10, compared with 4T1 control group, 4T1/M-M2 CM, 4T1/M-M2$^{NC}$ CM groups showed a tumor weight with no statistical difference, and the tumor volume tended to increase. 4T1/M-M2$^{MS3}$ CM group showed a tumor weight with a trend of decrease, and the tumor volume decreased significantly. Compared with 4T1/M-M2 CM group, 4T1/M-M2$^{MS3}$ CM group showed a tumor weight with a trend of decrease, and the tumor volume decreased significantly. Compared with 4T1/M-M2$^{NC}$ CM group, 4T1/M-M2$^{MS3}$ CM group showed a tumor weight with a trend of decrease, and the tumor volume decreased significantly. The M-M2 macrophage conditioned medium with down-regulated CD206 expression inhibits the ability of M2 macrophages to promote the growth of mouse breast cancer tumors and further inhibits the growth of mouse breast cancer tumors.

2. Effect of M-M2 Macrophages with Down-Regulated CD 206 Expression on the Growth of Breast Cancer Tumors in Mice To further verify the effect of M2-type macrophages on the growth of breast cancer tumors after CD206 down-regulation, M-M2 macrophages and 4T1-luc cells (4:1) were co-inoculated in the left forelimb axilla of Balb/c mice to construct a mouse breast cancer tumor model, respectively. The 4T1-luc, M-M2, M-M2$^{NC}$, and M-M2$^{MS3}$ cells were collected, and the cell density was adjusted to 2*10$^5$/mL. Then 100 µL of 4T1-luc cell suspension was mixed with 25 µL of M-M2, M-M2$^{NC}$, and M-M2$^{MS3}$ cell suspensions and co-inoculated in a 4:1 ratio into the axilla of the left forelimb of the mouse. The animals were labeled as 4T1+M-M2, 4T1+M-M2$^{NC}$, and 4T1+M-M2$^{MS3}$ groups, respectively. After 14 days, the mice were sacrificed by removing the neck. After the dissection and sampling, the tumor mass was weighed and the volume was calculated. The results are shown in Table 11 and FIGS. 9A-9C.

Figure 9A:
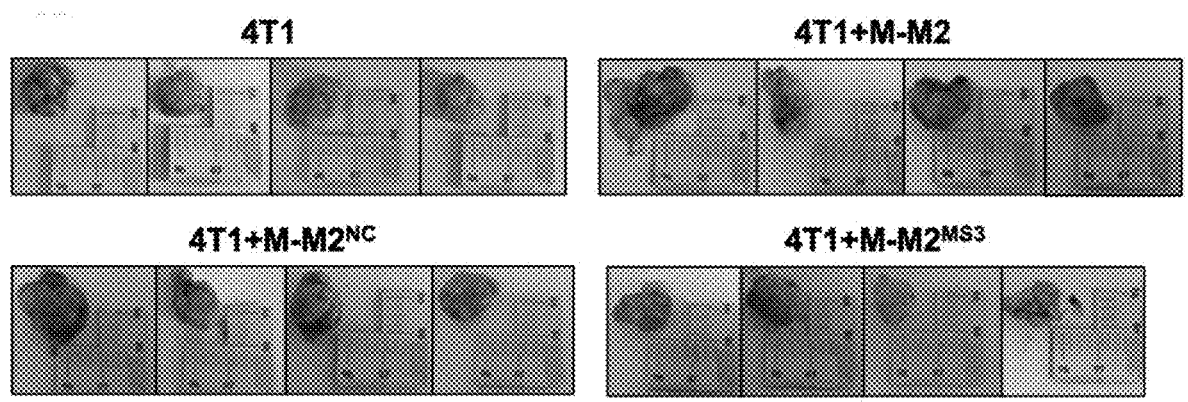
FIG. 9A is a photograph of a tumor generated by constructing a mouse breast cancer tumor model with the siRNA-9 as provided by the present invention.
Figure 9B:
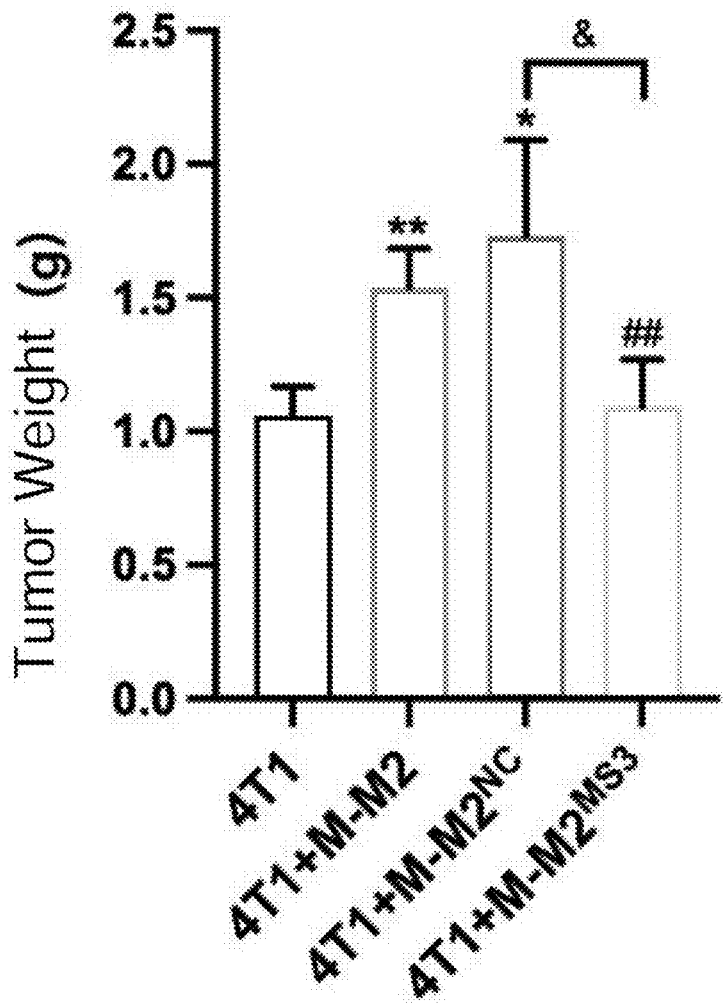
FIG. 9B is a statistical diagram of the weight of tumors generated by constructing a mouse breast cancer tumor model with the siRNA-9 as provided by the invention.
Figure 9C:
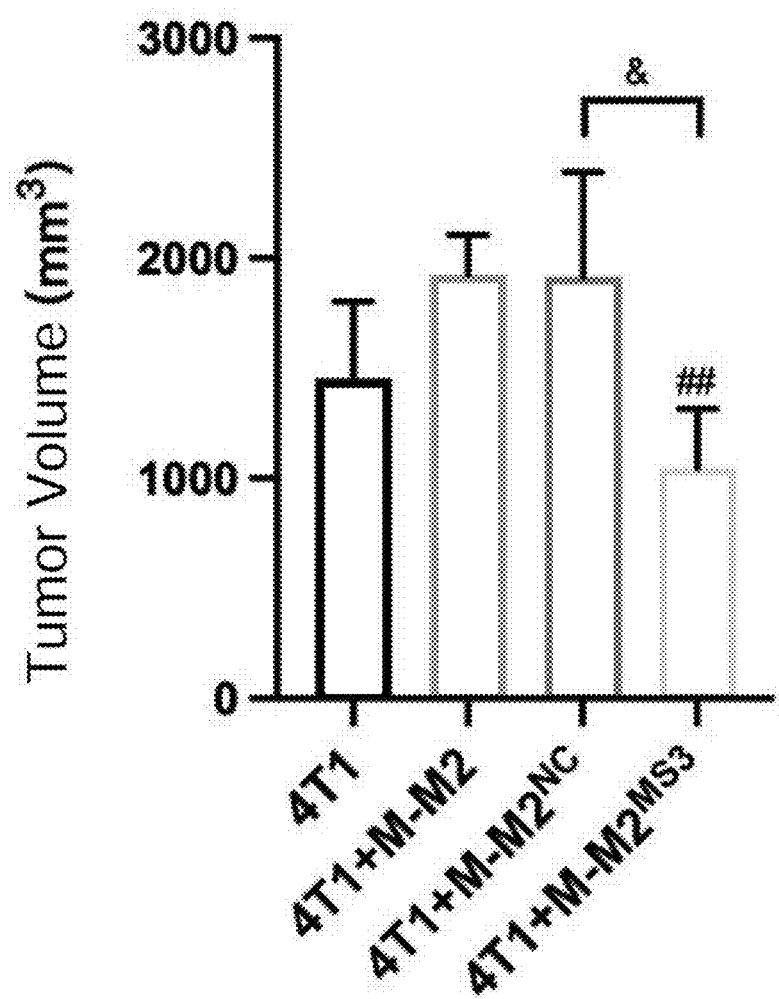
FIG. 9C is a statistical diagram of the tumor volume generated by constructing a mouse breast cancer tumor model with the siRNA-9 as provided by the invention.

FIG. 9A shows the tumor photograph of the mouse breast cancer tumor model in the groups of 4T1-luc cells co-inoculated with M-M2 macrophages (4:1), 4T1, 4T1+M-M2, 4T1+M-M2$^{NC}$, and 4T1+M-M2$^{MS3}$ under axillary inoculation on the left forelimb. FIG. 9B shows the columnar statistics of tumor weights in the 4T1, 4T1+M-M2, 4T1+M-M2$^{NC}$, and 4T1+M-M2$^{MS3}$ groups. FIG. 9C shows the columnar statistics of tumor volumes in the 4T1, 4T1+M-M2, 4T1+M-M2$^{NC}$, and 4T1+M-M2$^{MS3}$ groups. Experimental data were expressed as mean standard deviation (means±SD) (n=4). *: compared with 4T1 group, p<0.05; **: compared with 4T1 group, P<0.01; ##: compared with 4T1+M-M2 group, P<0.01; &: compared with 4T1+M-M2$^{NC}$ group, P<0.05.

TABLE 11

Effect of M-M2 macrophages with down-regulated CD206 expression on the growth of breast cancer tumors in mice

| Group | Weight (g) | Volume (mm$^3$) |
|---|---|---|
| 4T1 Group | 1.060 ± 0.108 | 1453.745 ± 348.866 |
| 4T1/M-M2 CM Group | 1.538 ± 0.147 | 1925.435 ± 181.390 |

TABLE 11-continued

Effect of M-M2 macrophages with down-regulated CD206 expression on the growth of breast cancer tumors in mice

| Group | Weight (g) | Volume (mm³) |
|---|---|---|
| 4T1/M-M2$^{NC}$ CM Group | 1.733 ± 0.359 | 1917.058 ± 473.258 |
| 4T1/M-M2$^{MS3}$ CM Group | 1.093 ± 0.177 | 1047.030 ± 269.296 |

As shown in FIGS. 9A-9C and Table 10, compared with 4T1 control group, 4T1+M-M2, 4T1+M-M2$^{NC}$ groups showed a tumor weight with significant increase, and the tumor volume tended to increase. 4T1+M-M2$^{MS3}$ group showed a tumor volume and weight with a trend of decrease. Compared with 4T1+M-M2 group, 4T1+M-M2$^{MS3}$ group showed a tumor volume and weight decreased significantly. Compared with 4T1+M-M2$^{NC}$ group, 4T1+M-M2$^{MS3}$ group showed a tumor volume and weight decreased significantly. This indicates that M-M2 macrophages with down-regulated CD206 expression inhibited the ability of M2-type macrophages to promote the growth of mouse breast cancer tumors and further inhibited the growth of mouse breast cancer tumors.

3. Effect of M-M2 Macrophage Conditioned Medium with Down-Regulated CD 206 Expression on Tumor Metastasis of Breast Cancer in Mice To further verify the effect of M2-type macrophages on breast cancer tumor metastasis after CD206 down-regulation, 4T1-luc cells treated with conditioned medium M-M2 CM, M-M2$^{NC}$ CM, M-M2$^{MS3}$ were respectively inoculated into Balb/c mice via tail vein to construct a mouse breast cancer tumor model.

The 4T1-luc cells were collected, and the cell density was adjusted to 2*10⁵/mL. Then 100 μl cell suspension was injected into the tail vein and the animals were labeled as the 4T1 group. The 4T1-luc cells cultured in the conditioned medium of M-M2 CM, M-M2$^{NC}$ CM, M-M2$^{MS3}$ CM for 24 h were collected, and the cell density was adjusted to be 2*10⁵/mL. 100 μL of cell suspension was inoculated into Balb/c mice through the tail vein, and the animals were labeled as 4T1/M-M2 CM, 4T1/M-M2$^{NC}$ CM and 4T1/M-M2$^{MS3}$ CM groups, respectively. After 7 days, animal luminescence imaging analysis were performed, and the results are shown in FIG. 10A to FIG. 10B and Table 12.

Figure 10A:
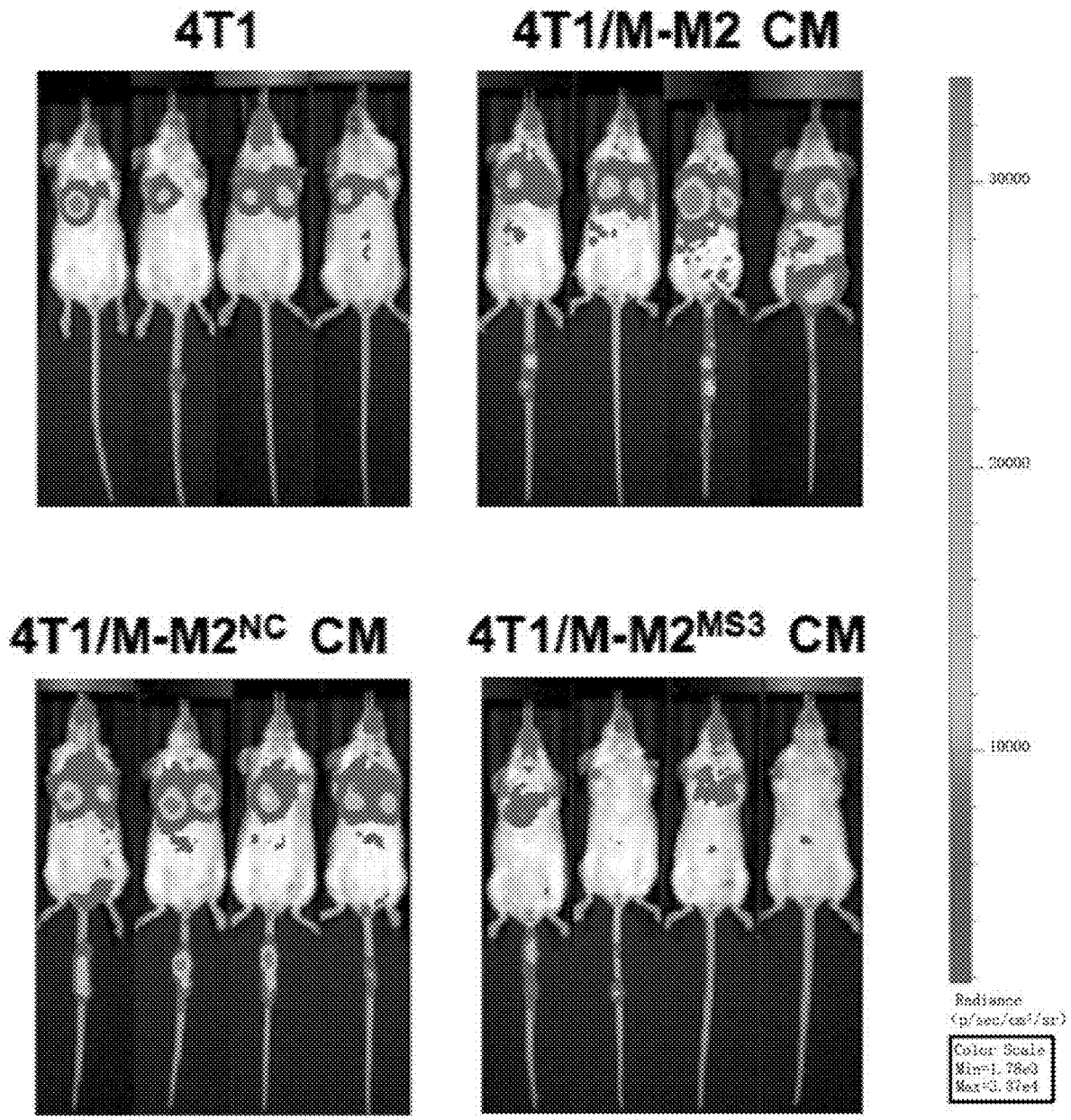
FIG. 10A is an animal imaging observation image of tail vein inoculation of 4T1-luc in a mouse breast cancer tumor model constructed by using the siRNA-9 as provided by the invention.
Figure 10B:
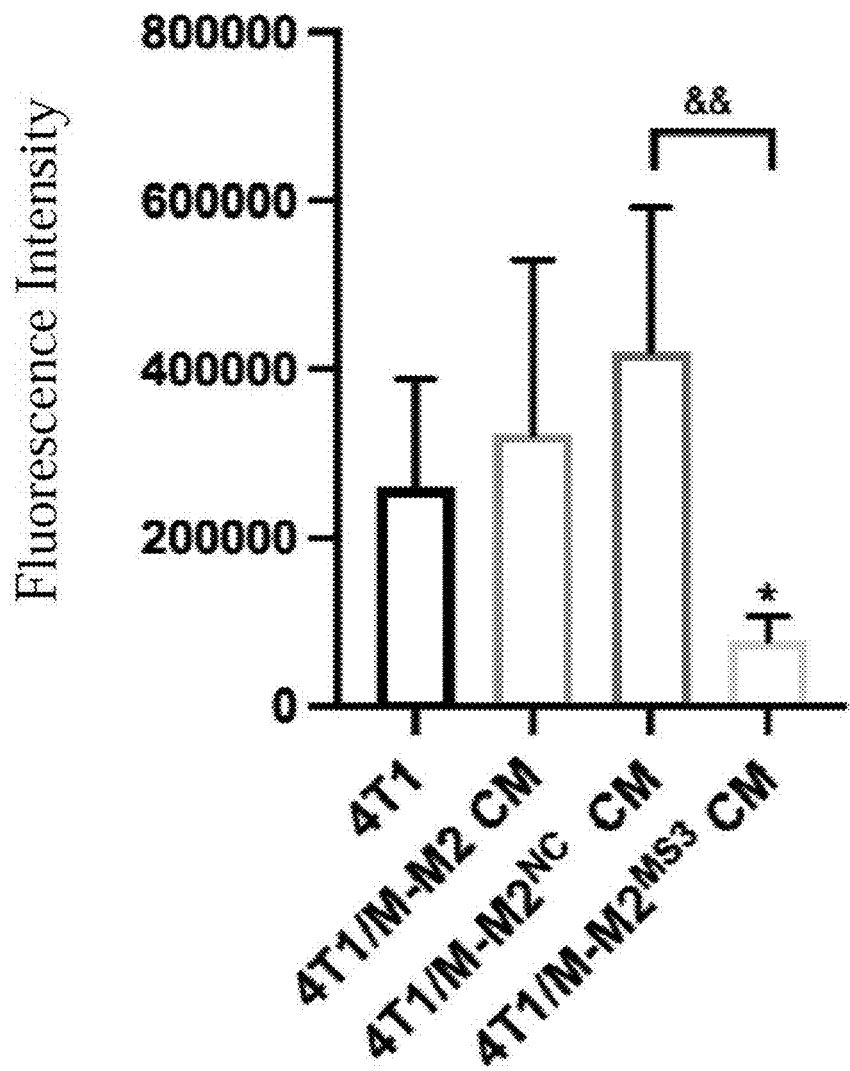
FIG. 10B is a columnar statistical diagram of fluorescence intensity of 4T1-luc inoculated into the tail vein of a mouse breast cancer tumor model constructed by the siRNA-9 as provided by the invention.

FIG. 10A shows a mouse breast cancer tumor metastasis model treated with 4T1-luc by tail vein inoculation conditioned medium, and the animal imaging observation images of 4T1, 4T1/M-M2 CM, 4T1/M-M2$^{NC}$ CM and 4T1/M-M2$^{MS3}$ groups. FIG. 10B shows the columnar statistics of imaging fluorescence intensities of animals in the 4T1, 4T1/M-M2 CM, 4T1/M-M2$^{NC}$ CM, and 4T1/M-M2$^{MS3}$ groups. Experimental data were expressed as mean±standard deviation (means±SD) (n=4). *: compared with 4T1 group, p<0.05; &&: compared with 4T1/M-M2$^{NC}$ CM group, P<0.01.

TABLE 12

Effect of M-M2 macrophage conditioned medium with down-regulated expression of CD206 on tumor metastasis of breast cancer in mice

| Group | Fluorescence Intensity |
|---|---|
| 4T1 Group | 260800.000 ± 127997.604 |
| 4T1/M-M2 CM Group | 323675.000 ± 205013.924 |
| 4T1/M-M2$^{NC}$ CM Group | 421850.000 ± 169752.712 |
| 4T1/M-M2$^{MS3}$ CM Group | 78722.500 ± 29097.586 |

As shown in FIGS. 10A-10B and Table 11, compared with 4T1 control group, 4T1/M-M2 CM, 4T1/M-M2$^{NC}$ CM group shows a lung fluorescence intensity with a trend of increase. 4T1/M-M2$^{MS3}$ CM group shows a lung fluorescence intensity decreased significantly. Compared with 4T1/M-M2 CM group, 4T1/M-M2$^{MS3}$ CM group shows a lung fluorescence intensity with a trend of decrease. Compared with 4T1/M-M2$^{NC}$ CM group, 4T1/M-M2$^{MS3}$ CM group shows a lung fluorescence intensity decreased significantly. The results showed that M-M2 macrophage conditioned medium with down-regulated CD206 expression inhibited the ability of M2 macrophages to promote tumor metastasis of breast cancer in mice and further inhibited tumor metastasis of breast cancer in mice.

4. Effect of M-M2 Macrophages with Down-Regulated CD 206 Expression on Tumor Metastasis of Breast Cancer in Mice To further verify the effect of M2-type macrophages on breast cancer tumor metastasis after CD206 down-regulation, M-M2 macrophages and 4T1-luc cells (4:1) were co-inoculated via tail vein into Balb/c mice to construct a mouse breast cancer tumor model, respectively.

The 4T1-luc, M-M2, M-M2$^{NC}$, and M-M2$^{MS3}$ cells were collected, and the cell density was adjusted to 2*10⁵/mL. Then 100 μL of 4T1-luc cell suspension was mixed with 25 μL of M-M2, M-M2$^{NC}$, and M-M2$^{MS3}$ cell suspension, and co-inoculated in a 4:1 ratio into Balb/c mice through the caudal vein. The animals were respectively labeled as 4T1+M-M2, 4T1+M-M2$^{NC}$, and 4T1+M-M2$^{MS3}$ groups. After 7 days, animal luminescence imaging analysis were performed, and the results are shown in FIGS. 11A-11B and Table 13.

Figure 11A:
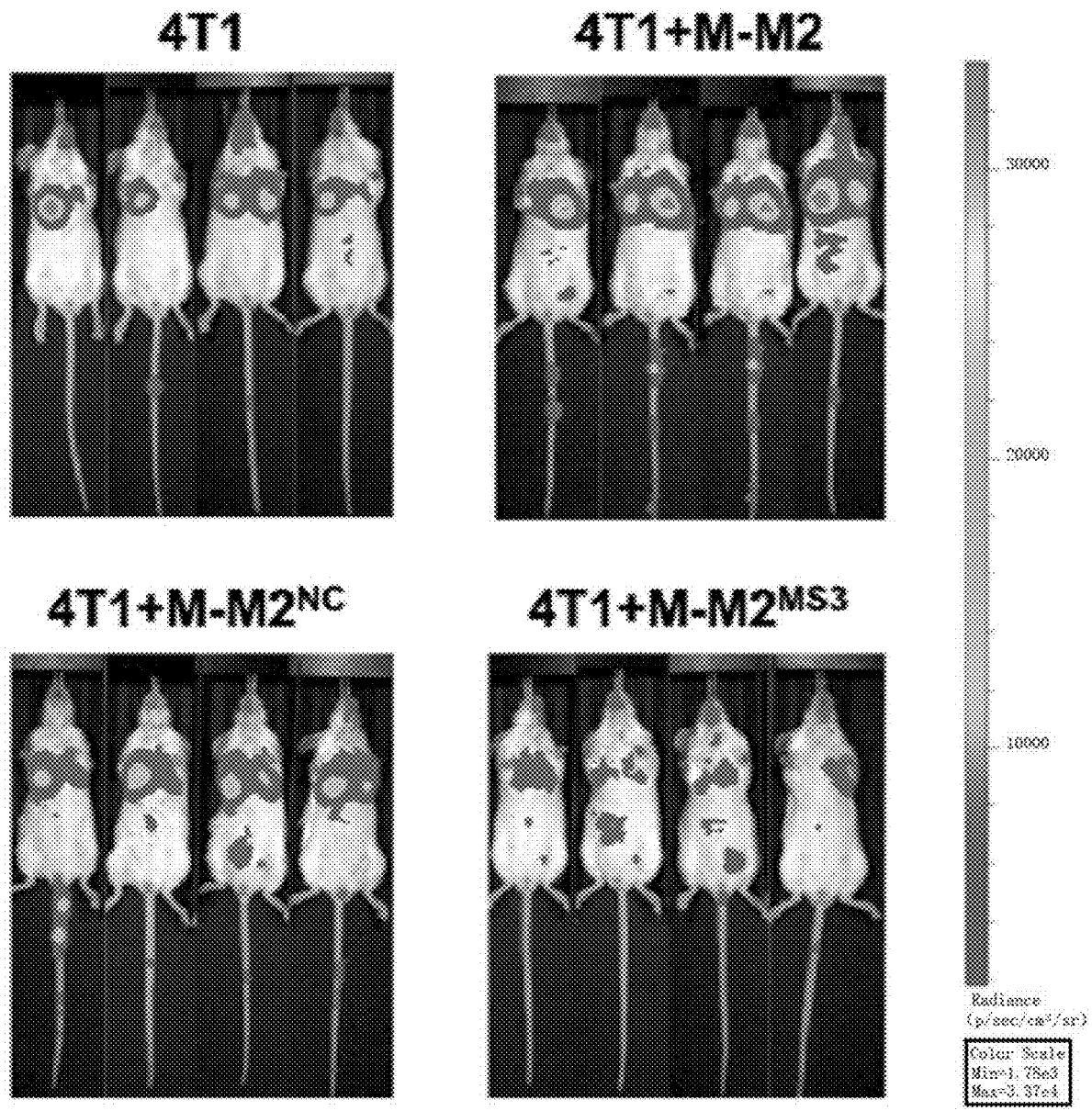
FIG. 11A is an animal imaging observation image of M-M2 macrophages and 4T1-luc inoculated into the tail vein of a mouse breast cancer tumor model constructed by the siRNA-9 as provided by the invention.
Figure 11B:
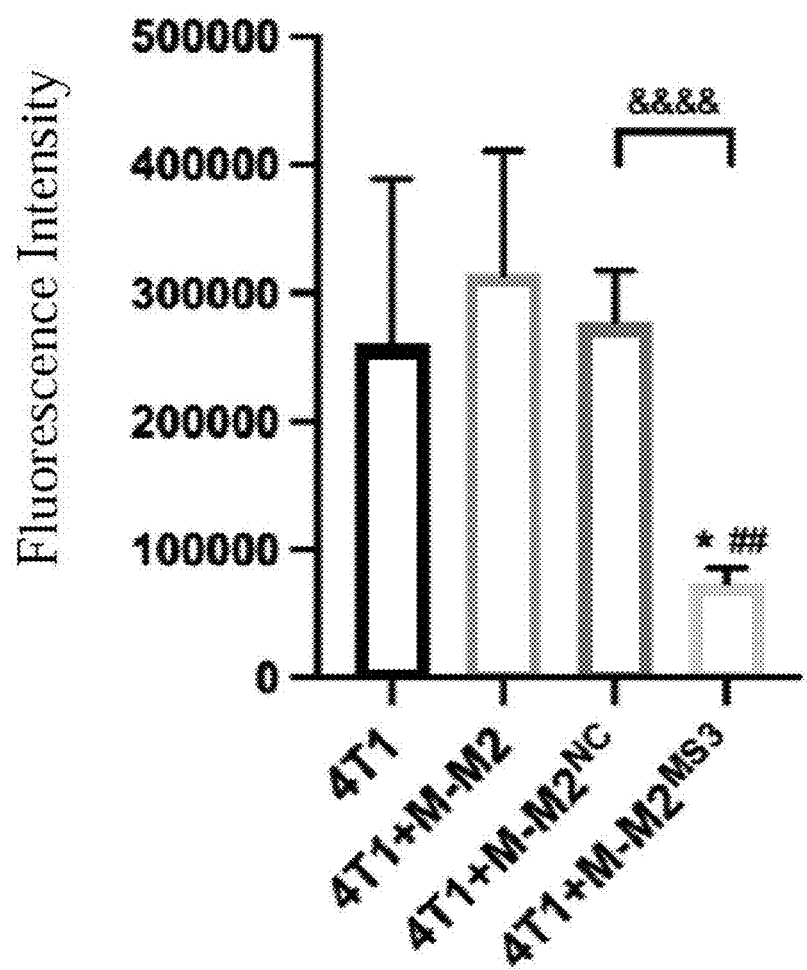
FIG. 11B is a columnar statistical diagram of fluorescence intensity of M-M2 macrophages and 4T1-luc inoculated into the tail vein of a mouse breast cancer tumor model constructed by using the siRNA-9 as provided by the invention.

FIG. 11A is an animal imaging observation image of a mouse breast cancer tumor metastasis model co-inoculated with M-M2 macrophages and 4T1-luc (4:1) in the caudal vein from 4T1, 4T1+M-M2, 4T1+M-M2$^{NC}$, and 4T1+M-M2$^{MS3}$ groups. FIG. 11B is a columnar statistical diagram of imaging fluorescence intensity of animals in the 4T1, 4T1+M-M2, 4T1+M-M2$^{NC}$, and 4T1+M-M2$^{MS3}$ groups. Experimental data were expressed as mean±standard deviation (means±SD) (n=4). *: compared with 4T1 group, p<0.05; ##: compared with 4T1+M-M2 group, P<0.01; &&&&, compared with 4T1+M-M2 group, p<0.0001.

TABLE 13

Effect of M-M2 macrophages with down-regulated CD206 expression on tumor metastasis of breast cancer in mice

| Group | Fluorescence Intensity |
|---|---|
| 4T1 Group | 260800.000 ± 127997.604 |
| 4T1 + M-M2 Group | 314650.000 ± 96561.880 |
| 4T1 + M-M2$^{NC}$ Group | 277550.000 ± 39802.219 |
| 4T1 + M-M2$^{MS3}$ Group | 74322.500 ± 11136.359 |

As shown in Table 13 and FIGS. 11A-11B, compared with 4T1 control group, 4T1+M-M2, 4T1+M-M2$^{NC}$ group showed a lung fluorescence intensity increased significantly. 4T1+M-M2$^{MS3}$ group showed a lung fluorescence intensity decreased significantly. Compared with 4T1+M-M2 group, 4T1+M-M2$^{MS3}$ group showed a lung fluorescence intensity decreased significantly. Compared with 4T1+M-M2$^{NC}$ group, 4T1+M-M2$^{MS3}$ group showed a lung fluorescence intensity decreased significantly. The results showed that M-M2 macrophages with down-regulated CD206 expression inhibited the ability of M2-type macrophages to promote the growth of mouse breast cancer tumors and further inhibited the metastasis of mouse breast cancer tumors.

As can be seen from the above Examples, the siRNA as provided by the invention can target the M2 macrophage CD206, and inhibit the ability of M2-type macrophages to promote the growth of breast cancer tumors and further inhibit the metastasis of breast cancer tumors by inhibiting the expression of the M2 macrophage CD206.

Although only breast cancer was used to confirmed that the siRNA as provided by the present invention inhibits the growth and metastasis of breast cancer tumors by inhibiting M2-type macrophages, the siRNA provided by the invention directly acts on M2-type macrophages, and the M2-type macrophages can not only act on breast cancer cells but also act on other types of tumor cells, such as glioma cells, breast cancer cells, cervical cancer cells, lung cancer cells, gastric cancer cells, colorectal cancer cells, duodenal cancer cells, leukemia cells, prostate cancer cells, endometrial cancer cells, thyroid cancer cells, lymphoma cells, pancreatic cancer cells, liver cancer cells, melanoma cells, skin cancer cells, pituitary tumor cells, germ cell tumor cells, meningioma cells, meningeal cancer cells, glioblastoma cells, astrocytoma cells, oligodendroglioma cells, oligoastrocytoma cells, ependymoma cells, choroid plexus papilloma cells, choroid plexus cancer cells, chordoma cells, ganglioneuroma cells, olfactory neuroblastoma cells, sympathetic nervous system neuroblastoma cells, pinealocytoma cells, pinealoblastoma cells, medulloblastoma cells, trigeminal schwannoma cells, facial acoustic neuroma cells, jugular bulb cells, hemangioblastoma cells, craniopharyngioma cells or granulocytoma cells. Therefore, the siRNA provided by the invention can inhibit the growth and metastasis of various types of tumor cells by inhibiting the expression of the M2-type macrophage CD206, and can achieve the effect of treating various tumors by one pathway.

The example described above represent only a few embodiments of the present invention and are described in more detailed manner, but are not to be construed as limiting the scope of the patent of the invention. It should be noted that it will be apparent to those skilled in the art that variations and modifications may be made without departing from the spirit of the invention, which is intended to be encompassed by the present invention. Therefore, the scope of protection of the patent of the invention shall be subject to the appended claims.

What is claimed is:

1. An siRNA specifically targeting M2 macrophage CD206, wherein the siRNA is:
   1) One or more of siRNA-1, siRNA-2, siRNA-3, siRNA-4, siRNA-5, and siRNA-6; or,
   2) one or more of siRNA-7, siRNA-8, siRNA-9, siRNA-10, siRNA-11, and siRNA-12;
   wherein in the siRNA-1, the sense strand nucleotide sequence is shown as SEQ ID NO: 1, and the antisense strand nucleotide sequence is shown as SEQ ID NO: 2;
   in the siRNA-2, the sense strand nucleotide sequence is shown as SEQ ID NO: 3, and the antisense strand nucleotide sequence is shown as SEQ ID NO: 4;
   in the siRNA-3, the sense strand nucleotide sequence is shown as SEQ ID NO: 5, and the antisense strand nucleotide sequence is shown as SEQ ID NO: 6;
   in the siRNA-4, the sense strand nucleotide sequence is shown as SEQ ID NO: 7, and the antisense strand nucleotide sequence is shown as SEQ ID NO: 8;
   in the siRNA-5, the sense strand nucleotide sequence is shown as SEQ ID NO: 9, and the antisense strand nucleotide sequence is shown as SEQ ID NO: 10;
   in the siRNA-6, the sense strand nucleotide sequence is shown as SEQ ID NO: 11, and the antisense strand nucleotide sequence is shown as SEQ ID NO: 12;
   in the siRNA-7, the sense strand nucleotide sequence is shown as SEQ ID NO: 13, and the antisense strand nucleotide sequence is shown as SEQ ID NO: 14 ;
   in the siRNA-8, the sense strand nucleotide sequence is shown as SEQ ID NO: 15, and the antisense strand nucleotide sequence is shown as SEQ ID NO: 16 ;
   in the siRNA-9, the sense strand nucleotide sequence is shown as SEQ ID NO: 17, and the antisense strand nucleotide sequence is shown as SEQ ID NO: 18;
   in the siRNA-10, the sense strand nucleotide sequence is shown as SEQ ID NO: 19, and the antisense strand nucleotide sequence is shown as SEQ ID NO: 20;
   in the siRNA-11, the sense strand nucleotide sequence is shown as SEQ ID NO: 21, and the antisense strand nucleotide sequence is shown as SEQ ID NO: 22;
   in the siRNA-12, the sense strand nucleotide sequence is shown as SEQ ID NO: 23, and the antisense strand nucleotide sequence is shown as SEQ ID NO: 24.

2. A method of inhibiting the growth or proliferation of tumor cells comprising administering to a subject a composition comprising M2 macrophages transfected ex vivo with the siRNA according to claim 1.

3. The method according to claim 2, wherein the tumor cells are glioma cells, breast cancer cells, cervical cancer cells, lung cancer cells, gastric cancer cells, colorectal cancer cells, duodenal cancer cells, leukemia cells, prostate cancer cells, endometrial cancer cells, thyroid cancer cells, lymphoma cells, pancreatic cancer cells, liver cancer cells, melanoma cells, skin cancer cells, pituitary tumor cells, germ cell tumor cells, meningioma cells, meningeal cancer cells, glioblastoma cells, astrocytoma cells, oligodendroglioma cells, oligoastrocytoma cells, ependymoma cells, choroid plexus papilloma cells, choroid plexus cancer cells, chordoma cells, ganglioneuroma cells, olfactory neuroblastoma cells, sympathetic nervous system neuroblastoma cells, pinealocytoma cells, pinealoblastoma cells, medulloblastoma cells, trigeminal schwannoma cells, facial acoustic neuroma cells, jugular bulb cells, hemangioblastoma cells, craniopharyngioma cells, or granulocytoma cells.

* * * * *

SEQUENCE LISTING

```
Sequence total quantity: 36
SEQ ID NO: 1            moltype = RNA  length = 21
FEATURE                 Location/Qualifiers
source                  1..21
                        mol_type = other RNA
                        organism = synthetic construct
SEQUENCE: 1
gtgtgaccat gtattcaaat t                                              21

SEQ ID NO: 2            moltype = RNA  length = 21
FEATURE                 Location/Qualifiers
source                  1..21
                        mol_type = other RNA
                        organism = synthetic construct
SEQUENCE: 2
tttgaataca tggtcacact t                                              21

SEQ ID NO: 3            moltype = RNA  length = 21
FEATURE                 Location/Qualifiers
source                  1..21
                        mol_type = other RNA
                        organism = synthetic construct
SEQUENCE: 3
caaccaggat gccgaatcat t                                              21

SEQ ID NO: 4            moltype = RNA  length = 21
FEATURE                 Location/Qualifiers
source                  1..21
                        mol_type = other RNA
                        organism = synthetic construct
SEQUENCE: 4
tgattcggca tcctggttgt t                                              21

SEQ ID NO: 5            moltype = RNA  length = 21
FEATURE                 Location/Qualifiers
source                  1..21
                        mol_type = other RNA
                        organism = synthetic construct
SEQUENCE: 5
ggatcgccct gaacagtaat t                                              21

SEQ ID NO: 6            moltype = RNA  length = 21
FEATURE                 Location/Qualifiers
source                  1..21
                        mol_type = other RNA
                        organism = synthetic construct
SEQUENCE: 6
ttactgttca gggcgatcct t                                              21
```

```
SEQ ID NO: 7              moltype = RNA   length = 21
FEATURE                   Location/Qualifiers
source                    1..21
                          mol_type = other RNA
                          organism = synthetic construct
SEQUENCE: 7
gtaacttgac tgataatcat t                                                    21

SEQ ID NO: 8              moltype = RNA   length = 21
FEATURE                   Location/Qualifiers
source                    1..21
                          mol_type = other RNA
                          organism = synthetic construct
SEQUENCE: 8
tgattatcag tcaagttact t                                                    21

SEQ ID NO: 9              moltype = RNA   length = 21
FEATURE                   Location/Qualifiers
source                    1..21
                          mol_type = other RNA
                          organism = synthetic construct
SEQUENCE: 9
gattgttcag aaatgttgat t                                                    21

SEQ ID NO: 10             moltype = RNA   length = 21
FEATURE                   Location/Qualifiers
source                    1..21
                          mol_type = other RNA
                          organism = synthetic construct
SEQUENCE: 10
tcaacatttc tgaacaatct t                                                    21

SEQ ID NO: 11             moltype = RNA   length = 21
FEATURE                   Location/Qualifiers
source                    1..21
                          mol_type = other RNA
                          organism = synthetic construct
SEQUENCE: 11
ggcttaaatg acattaagat t                                                    21

SEQ ID NO: 12             moltype = RNA   length = 21
FEATURE                   Location/Qualifiers
source                    1..21
                          mol_type = other RNA
                          organism = synthetic construct
SEQUENCE: 12
tcttaatgtc atttaagcct t                                                    21

SEQ ID NO: 13             moltype = RNA   length = 21
FEATURE                   Location/Qualifiers
source                    1..21
                          mol_type = other RNA
                          organism = synthetic construct
SEQUENCE: 13
gcaagcattt gttacctatt t                                                    21

SEQ ID NO: 14             moltype = RNA   length = 21
FEATURE                   Location/Qualifiers
source                    1..21
                          mol_type = other RNA
                          organism = synthetic construct
SEQUENCE: 14
ataggtaaca aatgcttgct t                                                    21

SEQ ID NO: 15             moltype = RNA   length = 21
FEATURE                   Location/Qualifiers
source                    1..21
                          mol_type = other RNA
                          organism = synthetic construct
SEQUENCE: 15
gcatgaagca gagacatatt t                                                    21

SEQ ID NO: 16             moltype = RNA   length = 21
FEATURE                   Location/Qualifiers
source                    1..21
                          mol_type = other RNA
                          organism = synthetic construct
SEQUENCE: 16
atatgtctct gcttcatgct t                                                    21
```

```
SEQ ID NO: 17            moltype = RNA  length = 21
FEATURE                  Location/Qualifiers
source                   1..21
                         mol_type = other RNA
                         organism = synthetic construct
SEQUENCE: 17
gtggtatgca gactgcacct t                                                   21

SEQ ID NO: 18            moltype = RNA  length = 21
FEATURE                  Location/Qualifiers
source                   1..21
                         mol_type = other RNA
                         organism = synthetic construct
SEQUENCE: 18
ggtgcagtct gcataccact t                                                   21

SEQ ID NO: 19            moltype = RNA  length = 21
FEATURE                  Location/Qualifiers
source                   1..21
                         mol_type = other RNA
                         organism = synthetic construct
SEQUENCE: 19
ggcattcttt accagataat t                                                   21

SEQ ID NO: 20            moltype = RNA  length = 21
FEATURE                  Location/Qualifiers
source                   1..21
                         mol_type = other RNA
                         organism = synthetic construct
SEQUENCE: 20
ttatctggta aagaatgcct t                                                   21

SEQ ID NO: 21            moltype = RNA  length = 21
FEATURE                  Location/Qualifiers
source                   1..21
                         mol_type = other RNA
                         organism = synthetic construct
SEQUENCE: 21
ggcttacggt gaaccaaatt t                                                   21

SEQ ID NO: 22            moltype = RNA  length = 21
FEATURE                  Location/Qualifiers
source                   1..21
                         mol_type = other RNA
                         organism = synthetic construct
SEQUENCE: 22
atttggttca ccgtaagcct t                                                   21

SEQ ID NO: 23            moltype = RNA  length = 21
FEATURE                  Location/Qualifiers
source                   1..21
                         mol_type = other RNA
                         organism = synthetic construct
SEQUENCE: 23
ccactgacta cgacaaagat t                                                   21

SEQ ID NO: 24            moltype = RNA  length = 21
FEATURE                  Location/Qualifiers
source                   1..21
                         mol_type = other RNA
                         organism = synthetic construct
SEQUENCE: 24
tctttgtcgt agtcagtggt t                                                   21

SEQ ID NO: 25            moltype = DNA  length = 19
FEATURE                  Location/Qualifiers
source                   1..19
                         mol_type = other DNA
                         organism = synthetic construct
SEQUENCE: 25
gtgtgaccat gtattcaaa                                                      19

SEQ ID NO: 26            moltype = DNA  length = 19
FEATURE                  Location/Qualifiers
source                   1..19
                         mol_type = other DNA
                         organism = synthetic construct
SEQUENCE: 26
```

```
caaccaggat gccgaatca                                                        19

SEQ ID NO: 27           moltype = DNA   length = 19
FEATURE                 Location/Qualifiers
source                  1..19
                        mol_type = other DNA
                        organism = synthetic construct
SEQUENCE: 27
ggatcgccct gaacagtaa                                                        19

SEQ ID NO: 28           moltype = DNA   length = 19
FEATURE                 Location/Qualifiers
source                  1..19
                        mol_type = other DNA
                        organism = synthetic construct
SEQUENCE: 28
gtaacttgac tgataatca                                                        19

SEQ ID NO: 29           moltype = DNA   length = 19
FEATURE                 Location/Qualifiers
source                  1..19
                        mol_type = other DNA
                        organism = synthetic construct
SEQUENCE: 29
gattgttcag aaatgttga                                                        19

SEQ ID NO: 30           moltype = DNA   length = 19
FEATURE                 Location/Qualifiers
source                  1..19
                        mol_type = other DNA
                        organism = synthetic construct
SEQUENCE: 30
ggcttaaatg acattaaga                                                        19

SEQ ID NO: 31           moltype = DNA   length = 19
FEATURE                 Location/Qualifiers
source                  1..19
                        mol_type = other DNA
                        organism = synthetic construct
SEQUENCE: 31
gcaagcattt gttacctat                                                        19

SEQ ID NO: 32           moltype = DNA   length = 19
FEATURE                 Location/Qualifiers
source                  1..19
                        mol_type = other DNA
                        organism = synthetic construct
SEQUENCE: 32
gcatgaagca gagacatat                                                        19

SEQ ID NO: 33           moltype = DNA   length = 19
FEATURE                 Location/Qualifiers
source                  1..19
                        mol_type = other DNA
                        organism = synthetic construct
SEQUENCE: 33
gtggtatgca gactgcacc                                                        19

SEQ ID NO: 34           moltype = DNA   length = 19
FEATURE                 Location/Qualifiers
source                  1..19
                        mol_type = other DNA
                        organism = synthetic construct
SEQUENCE: 34
ggcattcttt accagataa                                                        19

SEQ ID NO: 35           moltype = DNA   length = 19
FEATURE                 Location/Qualifiers
source                  1..19
                        mol_type = other DNA
                        organism = synthetic construct
SEQUENCE: 35
ggcttacggt gaaccaaat                                                        19
```

SEQ ID NO: 36        moltype = DNA    length = 19
FEATURE              Location/Qualifiers
source               1..19
                     mol_type = other DNA
                     organism = synthetic construct
SEQUENCE: 36
ccactgacta cgacaaaga                                                  19